(12) United States Patent
Iwata et al.

(10) Patent No.: US 8,229,325 B2
(45) Date of Patent: Jul. 24, 2012

(54) DECELERATOR, DRIVE DEVICE INCLUDING SAME, AND IMAGE FORMING APPARATUS INCORPORATING THE DRIVE DEVICE

(75) Inventors: Nobuo Iwata, Kanagawa (JP); Katsuaki Miyawaki, Kanagawa (JP); Hiromichi Matsuda, Kanagawa (JP); Makoto Komatsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 447 days.

(21) Appl. No.: 12/457,933

(22) Filed: Jun. 25, 2009

(65) Prior Publication Data
US 2009/0322020 A1    Dec. 31, 2009

(30) Foreign Application Priority Data
Jun. 30, 2008   (JP) .................................. 2008-171609

(51) Int. Cl.
*G03G 15/00*   (2006.01)
(52) U.S. Cl. ........................................................ 399/167
(58) Field of Classification Search .................... 399/167
See application file for complete search history.

(56) References Cited

U.S. PATENT DOCUMENTS

| | | | | |
|---|---|---|---|---|
| 4,183,254 | A * | 1/1980 | Good | 476/31 |
| 5,708,933 | A * | 1/1998 | Nogami et al. | 399/167 |
| 5,905,927 | A * | 5/1999 | Inoue et al. | 399/167 |
| 6,285,099 | B1 * | 9/2001 | Takami | 310/51 |
| 6,420,807 | B1 * | 7/2002 | Tsujimoto et al. | 310/83 |
| 7,491,142 | B2 * | 2/2009 | Takuroh et al. | 474/137 |
| 2004/0190928 | A1 * | 9/2004 | Tsunoda et al. | 399/91 |
| 2007/0172257 | A1 * | 7/2007 | Matsuda et al. | 399/167 |
| 2008/0181665 | A1 * | 7/2008 | Kim | 399/167 |
| 2008/0261768 | A1 * | 10/2008 | Miyawaki et al. | 475/284 |
| 2008/0271556 | A1 * | 11/2008 | Imamura et al. | 74/412 R |

FOREIGN PATENT DOCUMENTS

| | | |
|---|---|---|
| JP | 6-62984 | 8/1994 |
| JP | 10-288915 | 10/1998 |
| JP | 2981295 | 9/1999 |
| JP | 2000-346144 | 12/2000 |
| JP | 2001-134138 | 5/2001 |
| JP | 2002-171779 | 6/2002 |
| JP | 2002171779 A * | 6/2002 |

OTHER PUBLICATIONS

An English language abstract of Japanese Publication No. JP 1-138296, published May 31, 1989.
An English language abstract of Japanese Publication No. JP 4-245261, published Sep. 1, 1992.

* cited by examiner

*Primary Examiner* — David Gray
*Assistant Examiner* — David Bolduc
(74) *Attorney, Agent, or Firm* — Harness, Dickey & Pierce, P.L.C.

(57) ABSTRACT

A decelerator for reducing a speed of rotation of a drive source and transmitting drive of the drive source to an image bearing member of an image forming apparatus includes a drive shaft, a drive transmission member, and a pressure regulator. The drive shaft is rotated by the drive source. The drive transmission member is rotated by the drive shaft and includes a peripheral surface that contacts the drive shaft. The pressure regulator presses the drive shaft against a center of rotation of the drive transmission member and includes an alignment regulator to regulate alignment of the drive shaft in a direction of rotation of the drive transmission member. A drive device for rotating an image bearing member includes a drive source including a drive shaft, and the decelerator. An image forming apparatus includes the drive device and an image bearing member rotated by the drive device.

14 Claims, 22 Drawing Sheets

DECELERATOR, DRIVE DEVICE INCLUDING SAME, AND IMAGE FORMING APPARATUS INCORPORATING THE DRIVE DEVICE

CROSS-REFERENCE TO RELATED APPLICATIONS

This patent application is based on and claims priority pursuant to 35 U.S.C. §119 from Japanese Patent Application No. 2008-171609 filed on Jun. 30, 2008 in the Japan Patent Office, the entire contents of which are hereby incorporated herein by reference.

BACKGROUND OF THE INVENTION

1. Field of the Invention

Exemplary aspects of the present invention generally relate to a decelerator, a drive device including same, and an image forming apparatus incorporating the drive device.

2. Description of the Background Art

In general, image forming apparatuses, such as printers, facsimile machines, and copiers, are equipped with an image bearing member such as a photoreceptor. In such image forming apparatuses, as the image bearing member rotates, image forming processes such as charging, exposure, development, image transfer and so forth are carried out.

A drive source such as a motor is used to rotate the image bearing member. In general, the speed of rotation of the drive source is greater than a required speed of rotation of the image bearing member.

Conventionally, in order to reduce revolution of the motor, a decelerator using a gear is used. A traction oil is used as a lubricant suitable for transmission of rotational friction of the motor.

In the decelerator using the gear, when rotational loads are applied on the image bearing member during charging, exposure, development, image transfer, and so forth, backlash of the gear may cause fluctuation in the rotation speed of the image bearing member. Consequently, imaging quality is degraded.

To counteract this problem, a decelerator using the planetary roller is proposed. Because this decelerator does not utilize the gear, fluctuation in the rotation speed of the image bearing member can be prevented. However, a drawback of this approach is that the configuration using the planetary roller tends to be complicated, thus preventing reduction in the size and the cost of the apparatus.

In the decelerator using the gear, a flywheel is proposed to suppress fluctuation of the rotation speed of the image bearing member. In particular, drive force between a driving side and a driven side is transmitted by friction between a surface of a drive roller and a surface of a driven roller. It is advantageous in that fluctuation in the rotation speed of the flywheel due to backlash can be prevented.

In view of the above, the configuration described above may be employed in the decelerator so as to reduce the speed by a rotation ratio of the drive roller and the driven roller. However, a drawback of this approach is that because drive transmission is performed simply by using the friction between the surface of the drive roller and the surface of the driven roller, it is difficult to prevent fluctuation in the rotation speed, for the following reason.

In order to perform drive transmission using friction, the drive roller and the driven roller need to press against each other to maintain frictional force therebetween. In the meantime, in order to prevent fluctuation of the rotation speed, it is necessary to prevent undesirable drift of the drive roller and the driven roller. However, it is difficult to achieve both the desirable frictional force and prevention of fluctuation of the rotation speed at the same time.

When the drive roller and the driven roller press against each other in order to maintain a certain frictional force, rotation axes of the drive roller and the driven roller may bend, causing rotation of the rollers to fluctuate (decenter). As a result, the rotation speed fluctuates. If, on the other hand, the drive roller and the driven roller slightly contact or contact each other with only a little force, drive force is not properly transmitted, causing insufficient drive transmission.

SUMMARY OF THE INVENTION

In view of the foregoing, in one illustrative embodiment of the present invention, a decelerator for reducing a speed of rotation of a drive source and transmitting drive of the drive source to an image bearing member of an image forming apparatus includes a drive shaft, a drive transmission member, and a pressure regulator. The drive shaft is rotated by the drive source. The drive transmission member is rotated by the drive shaft and includes a peripheral surface that contacts the drive shaft. The pressure regulator presses the drive shaft against a center of rotation of the drive transmission member and includes an alignment regulator that regulates alignment of the drive shaft in a direction of rotation of the drive transmission member.

In another illustrative embodiment of the present invention, a drive device for rotating an image bearing member includes a drive source including a drive shaft, and a decelerator. The decelerator reduces a speed of rotation of the drive source and transmits drive of the drive source to the image bearing member. The decelerator includes a drive transmission member and a pressure regulator. The drive transmission member is rotated by the drive shaft and includes a peripheral surface that contacts the drive shaft. The pressure regulator presses the drive shaft against a center of rotation of the drive transmission member and includes an alignment regulator that regulates alignment of the drive shaft in a direction of rotation of the drive transmission member. The image bearing member is rotated by the drive force of the drive source through the drive transmission member.

Yet in another illustrative embodiment of the present invention, an image forming apparatus for forming an image includes an image bearing member to bear an electrostatic latent image on a surface thereof, driven by a drive device, a developing device to develop the electrostatic latent image formed on the image bearing member using toner to form a toner image, a transfer device to transfer the toner image onto a recording medium, a fixing device to fix the toner image, and the drive device. The drive device includes a drive source including a drive shaft, and a decelerator. The decelerator reduces a speed of rotation of the drive source and transmits drive of the drive source to the image bearing member. The decelerator includes a drive transmission member and a pressure regulator. The drive transmission member is rotated by the drive shaft and includes a peripheral surface that contacts the drive shaft. The pressure regulator presses the drive shaft against a center of rotation of the drive transmission member and includes an alignment regulator that regulates alignment of the drive shaft in a direction of rotation of the drive transmission member. The image bearing member is rotated by the drive force of the drive source through the drive transmission member.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

Figure 1:
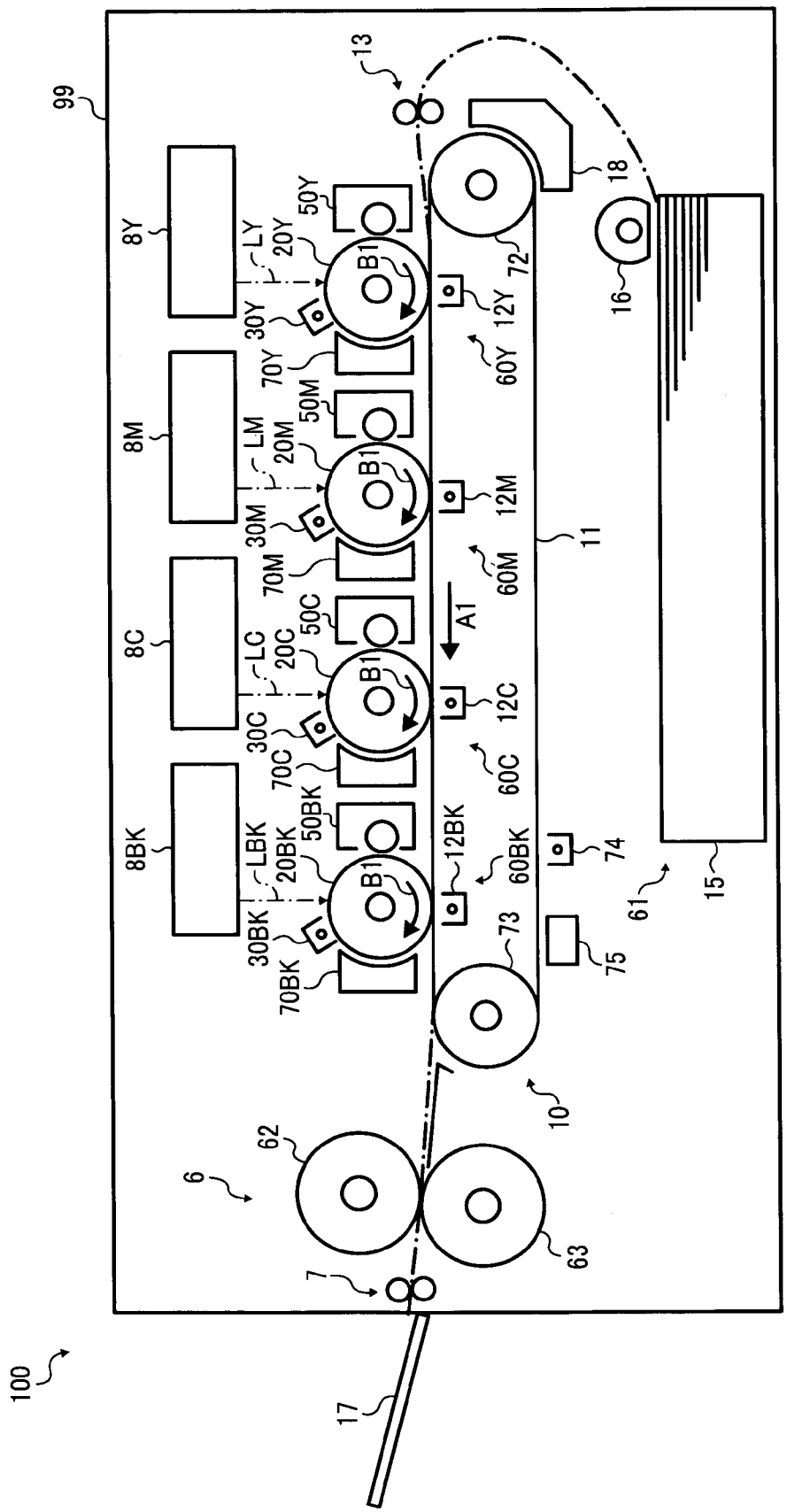
FIG. 1 is a schematic diagram illustrating an image forming apparatus in which an illustrative embodiment of the present invention is employed.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, and initially to FIG. 1, a multi-color image forming apparatus as one example of an image forming apparatus according to an illustrative embodiment of the present invention is described.

Referring now to FIG. 1, there is provided a schematic diagram illustrating an image forming apparatus 100 capable of producing a multi-color image. The image forming apparatus 100 is a multifunctional peripheral (hereinafter referred to as an MFP). However, the image forming apparatus 100 includes, but is not limited to a printer, a facsimile machine, a copier, a combination of the copier and the printer, and so forth.

The image forming apparatus 100 forms an image based on an image signal corresponding to image information received from external devices including, but not limited to a personal computer (PC). The image forming apparatus 100 can form an image on a normal recording sheet used for copying or the like, an OHP sheet, a card, a relatively thick sheet such as a postcard, an envelope, and so forth.

The image forming apparatus 100 is a tandem-type image forming apparatus in which a plurality of cylinder-shape photoreceptor drums 20Y, 20M, 20C, and 20BK are aligned in tandem. Each of the photoreceptor drums 20Y, 20M, 20C, and 20BK serves as an image bearing member that bears an image of yellow, magenta, cyan, and black, respectively.

The photoreceptor drums 20Y, 20M, 20C, and 20BK are provided equally spaced along an outer surface of a transfer belt 11, that is, on the image forming side, provided substantially at the center of a main body 99 of the image forming apparatus 100. The diameter of each of the photoreceptor drums 20Y, 20M, 20C, and 20BK is the same.

The photoreceptor drums 20Y, 20M, 20C, and 20BK are aligned in this order from upstream in a direction indicated by arrow A1 that is a moving direction of the transfer belt 11.

The image forming apparatus 100 includes four image forming stations 60Y, 60M, 60C, and 60BK for the colors of yellow (Y), magenta (M), cyan (C), and black (BK). The image forming stations 60Y, 60M, 60C, and 60BK include the photoreceptor drums 20Y, 20M, 20C, and 20BK, respectively.

It is to be noted that reference characters Y, M, C, and BK denote the colors yellow, magenta, cyan, and black, respectively. The image forming stations 60Y, 60M, 60C, and 60BK all have the same configuration, differing only in the color of toner employed.

Visible images, also know as toner images, of yellow, magenta, cyan, and black, are formed on the respective photoreceptor drums 20Y, 20M, 20C, and 20BK, and overlappingly transferred onto a recording sheet serving as a transfer medium transported by the transfer belt 11 moving in the direction of arrow A1.

Transfer devices 12Y, 12M, 12C, and 12BK serving as transfer chargers are provided opposite the photoreceptor drums 20Y, 20M, 20C, and 20BK through the transfer belt 11. The toner images formed on the photoreceptor drums 20Y, 20M, 20C, and 20BK are overlappingly transferred onto the same position of the recording sheet such that the transfer devices 12Y, 12M, 12C, and 12BK supply voltage to the photoreceptor drums 20Y, 20M, 20C, and 20BK opposite the transfer belt 11 with different timing from upstream to downstream in the direction of arrow A1, thereby overlappingly transferring the toner images onto the recording medium.

The transfer belt 11 is an elastic belt including a plurality of layers. The entire layers of the transfer belt 11 include elastic material such as rubber. The transfer belt 11 may be an elastic belt including a single elastic layer, or a portion of the transfer belt 11 includes elastic material. Alternatively, the transfer belt 11 includes fluororesin, polycarbonate resin, polyimide resin, and so forth. Alternatively, the transfer belt 11 may be a non-elastic belt.

The image forming apparatus 100 includes a transfer belt unit 10 provided substantially above the image forming stations 60Y, 60M, 60C, and 60BK, and opposite the photoreceptor drums 20Y, 20M, 20C, and 20BK. The transfer belt unit 10 serves as a transfer conveyer including the transfer belt 11.

The image forming apparatus 100 includes a sheet feeder 61, a pair of registration rollers 13, and a detector, not illustrated, that detects arrival of the tip of the recording sheet.

In the sheet feeder 61, recording media sheets to be transported to the space between the photoreceptor drums 20Y, 20M, 20C, and 20BK, and the transfer belt 11 are stacked. The pair of the registration rollers 13 send the recording sheet in a predetermined timing such that the recording sheet is aligned with the toner image formed in the image forming stations 60Y, 60M, 60C, and 60BK.

The image forming apparatus 100 also includes a fixing device 6, a sheet discharge roller 7 provided at a lateral side of the main body 99, a sheet discharge tray 17, toner bottles, not illustrated, that store toners of each color yellow, magenta, cyan, and black.

The fixing device 6 uses a fixing method using a roller and fixes the toner image transferred on the recording sheet. After fixation of the toner image, the sheet discharge roller 7 discharges the transfer sheet outside the main body of the image forming apparatus 100 from the fixing device. The transfer sheet discharged outside the main body 99 is stacked on the sheet discharge tray 17.

Figure 2:
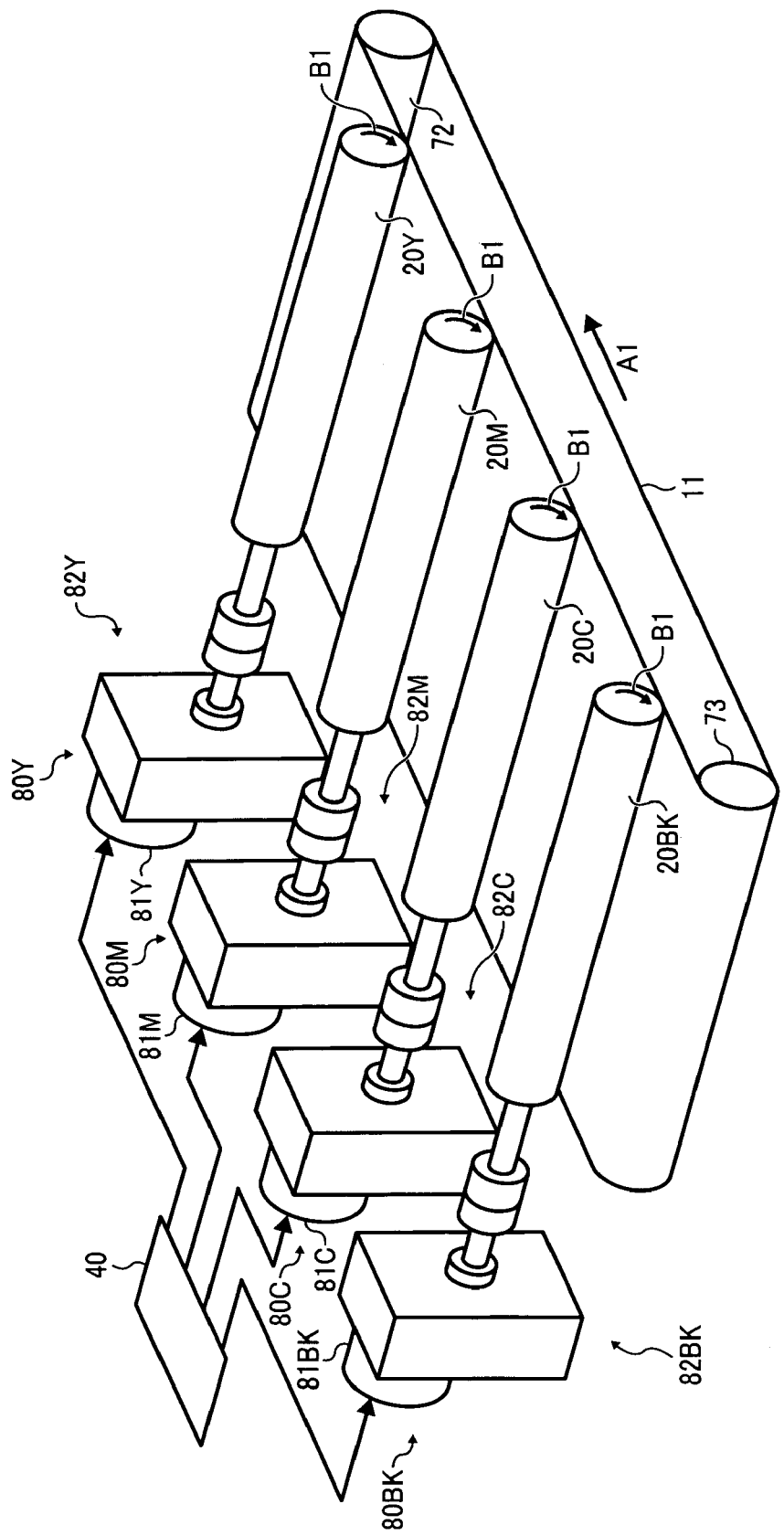
FIG. 2 is a perspective view of image bearing members, drive units, and so forth of the image forming apparatus of FIG. 1 according to an illustrative embodiment of the present invention.

The image forming apparatus 100 includes a CPU, not illustrated, storage devices such as a ROM, a RAM, and so forth. As illustrated in FIG. 2, the image forming apparatus 100 includes a controller 40 that controls overall operation of the image forming apparatus 100, such as operation of the photoreceptor drums 20Y, 20M, 20C, and 20BK.

Referring back to FIG. 1, the transfer belt unit 10 includes the transfer belt 11, a drive roller 72 serving as a drive member, a driven roller 73, a charge neutralizer 74, and a misalignment detector 75, a cleaning device 18, and so forth.

In the transfer belt unit 10, the transfer belt 11 is wound around and stretched between the drive roller 72 and the driven roller 73.

The charge neutralizer 74 is provided opposite the transfer belt 11 and serves as a charge neutralizing device that removes charge from the transfer belt 11. The misalignment detector 75 is provided upstream of the charge neutralizer 74 in the direction of arrow A1 facing the transfer belt 11. The misalignment detector 75 detects misalignment of patterns of each color formed on the transfer belt 11 in a misalignment detection mode.

Downstream of the charge neutralizer 74 in the direction of arrow A1, the cleaning device 18 is provided facing the transfer belt 11 and cleans the surface of transfer belt 11. The cleaning device 18 includes a cleaning brush, not illustrated.

The drive roller 72 is driven by a motor serving as a drive source, not illustrated, thereby rotating the transfer belt 11 in the direction of arrow A1. The drive roller 72 is connected to a power source, not illustrated, so that the drive roller 72 serves also as a charging roller that charges the transfer belt 11. Accordingly, the recording sheet is electrostatically absorbed to the transfer belt 11.

The driven roller 73 serves as a tension roller that urges the transfer belt 11 such that the transfer belt 11 rotates at a constant tension.

The charge neutralizer 74 removes charge from the surface of the transfer belt 11 charged by the drive roller 72 so that residual toner, paper dust, and so forth remaining on the surface of the transfer belt 11 are easily removed by the cleaning device 18.

The misalignment detector 75 detects patterns of each color formed by the image forming stations 60Y, 60M, 60C, and 60BK on the transfer belt 11 in the position misalignment detection mode. Misalignment of image forming positions of the image forming stations 60Y, 60M, 60C, and 60BK is read. Based on misalignment detected by the misalignment detector 75, the controller 40 adjusts the image forming positions of the image forming stations 60Y, 60M, 60C, and 60BK. The misalignment detector 75 includes a reflective photosensor or a transmissive photosensor.

The fixing device 6 includes a fixing roller 62 and a pressure roller 63. The fixing roller 62 includes a heat source, not illustrated. The pressure roller 63 contacts, and presses against the fixing roller 62. When the recording sheet bearing the toner image passes a fixing portion, the place where the fixing roller 62 and the pressure roller 63 meet and press against each other, heat and pressure are applied to the recording sheet, thereby fixing the toner image onto the surface of the recording sheet.

The sheet feeder 61 includes a sheet tray 15 serving as a sheet cassette and a sheet feed roller 16. The recording media sheets are stacked on the sheet tray 15. The sheet feed roller 16 sends the recording sheet on the sheet tray 15 one sheet at a time.

A description is now provided of a configuration of the image forming stations 60Y, 60M, 60C, and 60BK. As previously indicated, the image forming stations 60Y, 60M, 60C, and 60BK all have the same configuration, differing only in the color of toner employed. Thus, the description is thereafter provided of the image forming station 60Y for the color yellow as a representative example of the image forming stations.

The image forming station 60Y equipped with the photoreceptor drum 20Y includes the transfer device 12Y, a cleaning device 70, a charging device 30Y, and a developing device 50Y, around the photoreceptor drum 20Y in the rotation direction of the photoreceptor drum 20Y indicated by arrow B1 in a clockwise direction. The cleaning device 70Y cleans the photoreceptor drum 20Y. The charging device 30Y charges the photoreceptor drum 20Y at a high voltage. The developing device 50Y develops the photoreceptor drum 20Y.

The image forming station 60Y includes an optical scanner 8Y substantially above the photoreceptor drum 20Y. The optical scanner 8Y serves as an optical writing device that exposes the photoreceptor drum 20Y between the charging device 30Y and the developing device 50Y. The optical scanner 8Y emits a laser beam LY based on the image signal to scan and expose the surface of the photoreceptor drum 20Y, thereby forming an electrostatic latent image on the photoreceptor drum 20Y.

As illustrated in FIG. 2, the image forming station 60Y includes a driving unit 80Y including a motor 81Y serving as a drive source to rotate the photoreceptor drum 20Y. A description of the driving unit 80Y will be provided later.

With the configuration described above, when the photoreceptor drum 20Y rotates in the direction of arrow B1, the surface thereof is evenly charged by the charging device 30Y, and an electrostatic latent image corresponding to the color yellow is formed thereon as the optical scanner 8 illuminates and exposes the surface with the laser beam LY.

When the laser beam LY scans the surface of the photoreceptor drum 20Y in a main scan direction, the electrostatic latent image is formed thereon. In other words, the laser beam LY scans the surface of the photoreceptor drum 20Y in a direction perpendicular to the recording sheet while the photoreceptor drum 20Y rotates in the direction of arrow B1 so that the photoreceptor drum 20Y is also scanned in a sub-scan direction corresponding to a circumference direction thereof.

The electrostatic latent image is developed with a charged yellow toner supplied by the developing device 50Y, thereby forming a visible image also known as a toner image. The toner image of yellow is transferred onto the recording sheet transported in the direction of arrow A1 by the transfer device 12Y.

After transfer, the cleaning device 70Y removes foreign substance such as residual toner in preparation for the subsequent charging by the charging device 30Y. The removed residual toner is recovered and stored.

Similar to the photoreceptor drum 20Y, the toner images of the colors cyan, magenta, and black are formed on the respective photoreceptor drums and overlappingly transferred at the same position on the recording sheet by the transfer devices 12C, 12M, and 12BK, while the recording sheet is transported in the direction of arrow A1.

The recording sheet is fed from the sheet feeder 61 and sent between the photoreceptor drums 20Y, 20C, 20M, and 20BK, and the transfer belt 11 such that based on a detection signal by a detector, the pair of the registration rollers 13 sends the recording sheet in appropriate timing such that the tip of the toner image on the photoreceptor drum 20Y faces the transfer belt 11.

After the toner images of all colors are transferred onto the recording sheet, the recording sheet is separated from the transfer belt 11 and advances to the fixing device 6. When passing through the fixing roller 62 and the pressure roller 63, the toner images are fixed on the recording sheet due to heat and pressure, thereby forming a composite color image.

Subsequently, after passing the fixing device 6, the recording sheet is stacked on the sheet discharge tray 17 via the sheet discharge roller 7.

After the recording sheet is transported from the transfer belt 11, charge of the transfer belt 11 is removed by the charge neutralizer 74 and then cleaned by the cleaning device 18 in preparation for transport of the subsequent recording sheet.

The driving units 80Y, 80M, 80C, and 80BK of the image forming apparatus 100 all have substantially the same configuration. Thus, to simplify the description, the reference characters Y, M, C, and BK indicating colors are omitted herein and the driving units 80Y, 80M, 80C, and 80BK are described as the driving unit 80. Similarly, the photoreceptor drums 20Y, 20M, 20C, and 20BK are described as the photoreceptor drum 20. The motors 81Y, 81M, 81C, and 81BK are described as the motor 81.

Figure 3A:
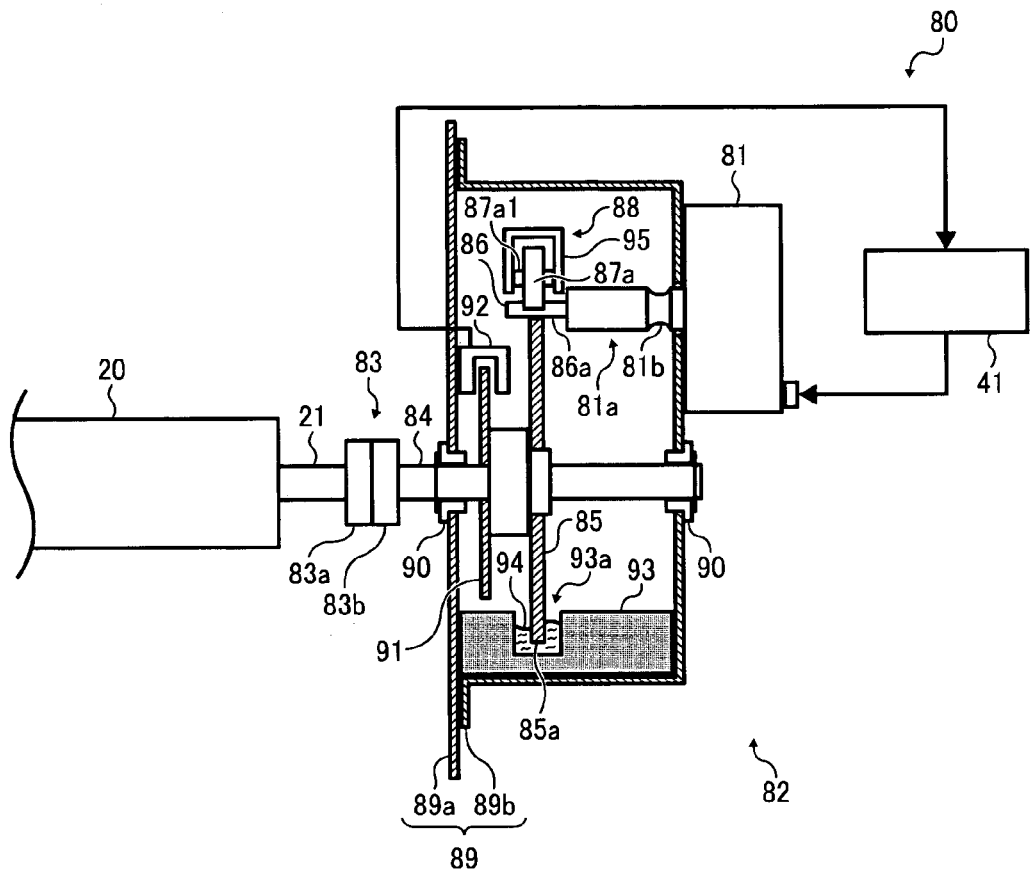
FIG. 3A is a cross-sectional view of the drive unit of FIG. 2 including a decelerator according to an illustrative embodiment of the present invention.

Referring now to FIG. 3A, there is provided a cross-sectional view of the driving unit 80 and a decelerator 82. As illustrated in FIG. 3A, the drive unit 80 includes the motor 81, the decelerator 82, and a coupling 83.

The decelerator 82 reduces the speed of rotation of the motor 81 to a desirable speed of rotation for the photoreceptor drum 20 and transmits the reduced speed of rotation to the photoreceptor drum 20. The coupling 83 connects the decelerator 82 with the photoreceptor drum 20.

The motor 81 includes a motor shaft 81a and a drive shaft 86. The motor shaft 81a is an output shaft. The drive shaft 86 is fixed to a tip of the motor shaft 81a and positioned substantially on a central axis of output rotation of the motor 81. The drive shaft 86 is driven by the motor 81.

As long as the drive shaft 86 transmits the drive force of the motor 81, the drive shaft 86 can be provided as a transmission shaft, and the drive shaft 81a itself may constitute the drive shaft.

The coupling 83 includes a first sub-first sub-coupling 83a and a second sub-second sub-coupling 83b. The first sub-first sub-coupling 83a is provided at an end portion of a shaft 21 of the photoreceptor drum 20. The rotation center of the photoreceptor drum 20 coincides with the center of rotation of the shaft 21. The second sub-second sub-coupling 83b is provided at an end portion of an output shaft 84 of the decelerator 82 and engages the first sub-coupling 83a. The first sub-coupling 83a and the second sub-coupling 83b of the coupling 83 are detachable from the shaft 21.

When the first sub-coupling 83a and the second sub-coupling 83b engage, rattling does not occur, and the shaft 21 and the output shaft 84 are coaxial. Accordingly, at the coupling 83, degradation of accuracy in rotation of the photoreceptor drum 20 is insignificant.

In order to accurately and smoothly drive the photoreceptor drum 20 with a compact configuration at low cost, the decelerator 82 includes a wheel 85. The wheel 85 is fixed to the output shaft 84, and the center of rotation of the wheel 85 coincides with the center of rotation of the photoreceptor drum 20. In other words, the wheel 85 is coaxially provided on the same shaft as the photoreceptor drum 20.

The wheel 85 serves as a drive transmission member that contacts the drive shaft 86 so as to transmit rotation of the drive shaft 86. A turning radius of the wheel 85 is greater than that of the drive shaft 86.

In the decelerator 82, the wheel 85 is integrally rotated with the photoreceptor drum 20 by the drive shaft 86 so that the rotation speed can be reduced using friction of the drive shaft 86 and the wheel 85 without a gear or a planetary roller.

At least a portion of the drive shaft 86 and a portion of the wheel 85 that meet and press against each other have a cylindrical shape. The center of rotation coincides with the axial center. A peripheral surface 86a of the cylinder portion of the drive shaft 86 and a peripheral surface 85a of the cylinder portion of the wheel 85 contact each other.

With this configuration, the drive force is transmitted through the smooth peripheral surfaces 86a and 85a, preventing rotation failure including irregular rotation such as that generated due to backlash of the gear. Furthermore, when compared to the gear, the surface finish of the peripheral surfaces is simpler than that of the gear, and circularity of the peripheral surface 86a and the peripheral surface 85a can be achieved more precisely and easily than with the gear. Thus, drive can be accurately and smoothly transmitted.

In order to transmit drive using friction between the peripheral surfaces 86a and 85a, the peripheral surfaces 86a and 85a need to meet and press each other. If the position of the drive shaft 86 and the wheel 85 is simply adjusted to enable the peripheral surfaces 86a and 85a to meet and press each other, it is difficult to transmit drive while preventing fluctuation in the rotation speed of the drive shaft 86 and the wheel 85 as described above.

In view of the above, the decelerator 82 includes a pressure regulator 88 to press the drive shaft 86 toward the center of rotation of the wheel 85. The pressure regulator 88 presses the drive shaft 86 toward the center of rotation of the wheel 85.

As will be later described, the present invention includes variations of the pressure regulator 88. However, in order to prevent the drive shaft 86 from shifting in the rotation direction of the wheel 85, the pressure regulator 88 includes an alignment regulator that engages the drive shaft 86 in a predetermined manner so as to press the drive shaft 86 against the peripheral surface 85a.

Figure 3B:
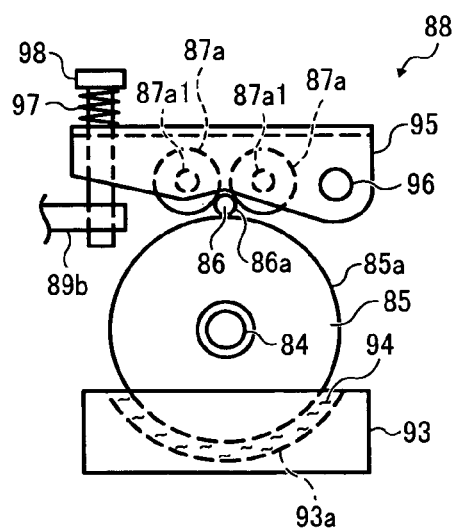
FIG. 3B is a front view of a pressure regulator of the decelerator according to an illustrative embodiment of the present invention.

According to the illustrative embodiment illustrated in FIG. 3B, one example of the alignment regulator includes two pressure rollers 87a. The pressure rollers 87a are follower rollers that contact the drive shaft 86 and follow the rotation of the drive shaft 86.

The decelerator 82 includes the output shaft 84, the wheel 85, a housing 89, shaft bearings 90, an encoder disk 91, and an encoder detector 92.

The housing 89 contains the wheel 85 and the pressure regulator 88, and supports the motor 81. The shaft bearings 90 rotatably support the output shaft 84 relative to the housing 89.

The encoder disk 91 is fixedly supported by the output shaft 84 inside the housing 89. The center of rotation of the encoder disk 91 coincides with the center of rotation of the output shaft 84. In other words, the encoder disk 91 is coaxial to the output shaft 84.

The encoder detector 92 serves as a rotation speed detector that detects the number of rotation of the output shaft 84, that is, the rotation speed of the output shaft 84. The encoder detector 92 is fixedly supported inside the housing 89 such that the rim of the encoder disk 91 is surrounded by the encoder detector 92.

The decelerator 82 includes an oil storage 93 serving as a lubricator, oil 94 serving as a lubricant, and a motor control circuit 41.

The oil storage 93 is provided substantially at the bottom of the housing 89 and includes a recessed portion 93a in which the rim of the wheel 85 is placed. The oil 94 serving as the lubricant is stored in the recessed portion 93a. The rim of the wheel 85 including the peripheral surface 85a is immersed in the oil 94.

The motor control circuit 41 controls the rotation speed, timing, and so forth of the motor 81 based on an output of the encoder detector 92.

The drive shaft 86 is a shaft member made of metal that is quenched and tempered. The drive shaft 86 is press-fitted into the motor shaft 81a and fixed thereto. Alternatively, the drive shaft 86 is fixed to the motor shaft 81a by welding or by other methods. Generally, as the drive shaft 86, a needle roller is preferably used because thermal processing and dimensional accuracy thereof are good.

In a case in which the motor shaft 81a itself serves also as the drive shaft 86, the tip of the motor shaft 81a is thermally processed so as to achieve a necessary dimension for the drive shaft 86.

The motor shaft 81a includes a groove portion 81b of reduced diameter, U-shaped in cross-section, provided substantially at the base of the motor shaft 81a in the vicinity of the motor 81. The groove portion 81b is a flexible member serving as a shock absorbing member. The diameter of the groove portion 81b is reduced in order to accommodate possible slight changes in the relative positions of the drive shaft 86 and the motor shaft 81a due to an error in the diameter and/or abrasion.

In other words, when the drive shaft 86 and the motor shaft 81a drift from the original center of rotation and rotate, a bend stress is applied thereto. However, because the motor shaft 81a is flexible at the groove portion 81b of reduced diameter, the drive shaft 86 and the motor shaft 81a are prevented from getting damaged, and fluctuation in frictional force between the drive shaft 86 and the wheel 85 can be reduced, if not prevented entirely. As a result, the drive shaft 86 reliably presses against the wheel 85.

If the length of the drive shaft 86 and the motor shaft 81*a* is substantially long, load per unit length is reduced even if the position of the tip portion fluctuates in terms of material mechanics. When the amount of fluctuation in the position of tip portion is the same, load on the tip portion varies inversely with the cube of the length of the shaft.

Therefore, it is possible to prevent the drive shaft 86 and the motor shaft 81*a* from getting damaged and to prevent the frictional force between the drive shaft 86 and the wheel 85 from fluctuating by extending the length of the drive shaft 86 and the motor shaft 81*a* so that the drive shaft 86 and the motor shaft 81*a* can be flexed. With this configuration, however, the size of the decelerator is increased. In view of this, and as an alternative thereto, the groove portion 81*b* is provided.

The wheel 85 is a disk member made of metal that is quenched and tempered. The wheel 85 is press-fitted into the output shaft 84 and fixed thereto. Alternatively, the wheel 85 can be fixed to the output shaft 84 using other methods.

It is important to coaxially provide the peripheral surface 85*a* of the wheel 85 and the output shaft 84. Thus, the wheel 85 is machined after the wheel 85 is fixed to the output shaft 84, thereby achieving the necessary dimensional accuracy. As a metal material for the wheel 85, it is preferable to use SUJ2 or the like that is used for a rolling bearing for stiffness and abrasion resistance.

The housing 89 includes a portion of a first side plate 89*a* of the main body 99 and a second side plate 89*b* fixed to the first side plate 89*a*. The first side plate 89*a* and the second side plate 89*b* are stationary relative to the main body 99. The motor 81 is fixed to the second side plate 89*b*.

Each of the bearings 90 is provided to the first side plate 89*a* and the second side plate 89*b* and rotatably supports the output shaft 84. The second sub-coupling 83*b* is fixed to the output shaft 84 outside the housing 89 at the side plate 89*a* side.

The encoder disk 91 is provided between the first side plate 89*a* and the wheel 85 on the output shaft 84. The encoder disk 91 includes a plurality of radial slits. The encoder detector 92 is fixed to the inner surface of the first side plate 89*a*. The encoder detector 92 detects how many times the output shaft 84 rotates by detecting the slits in the encoder disk 91.

The motor control circuit 41 serves as the rotation speed controller that performs feedback control of the speed of rotation of the drive shaft 86 in order to maintain a constant speed of rotation of the photoreceptor drum 20 based on the speed of rotation of the output shaft 84 detected by the encoder detector 92. This is accomplished as one of the functions of the controller 40.

Such feedback control is performed such that friction between the drive shaft 86 and the wheel 85 enables the photoreceptor drum 20 to rotate. In other words, during transmission of friction, even if a constant speed of rotation of the motor 81 is maintained, the speed of rotation of the photoreceptor drum 20 does not necessarily correspond to the speed of rotation of the motor 81 due to a process error in the diameter of the wheel 85 or abrasion thereof and/or slight slip, causing drift. Therefore, the feedback control is performed.

Figure 4:
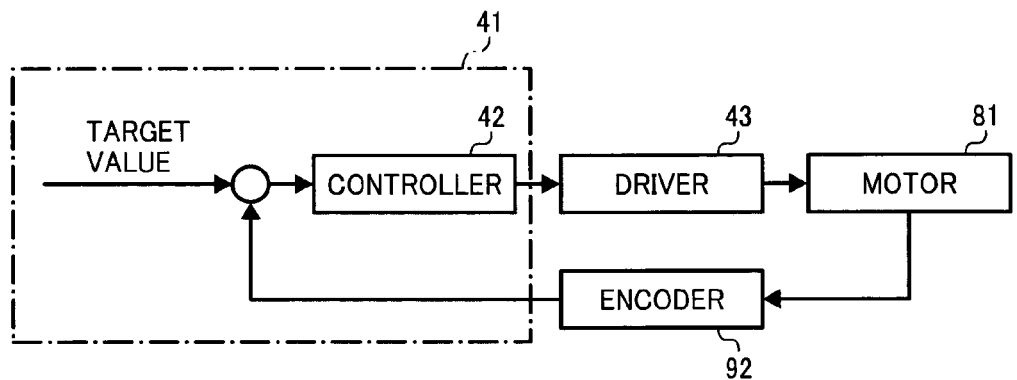
FIG. 4 is a block diagram illustrating feedback control in the drive unit and the decelerator according to an illustrative embodiment of the present invention.

Referring now to FIG. 4, there is provided a block diagram illustrating the feedback control. As illustrated in FIG. 4, when a target rotation speed of the photoreceptor drum 20 is set to the motor control circuit 41 so as to form an appropriate image on the photoreceptor drum 20, a controller 42 of the motor control circuit 41 generates a drive signal. Based on the drive signal, a driver 43 of the motor 81 is driven, applying current to the motor 81, thus causing the motor 81 to be driven.

The speed of rotation of the motor 81 is reduced based on the ratio of the rotation radius of the drive shaft 86 and the wheel 85, that is, a reduction ratio, and rotation of the motor 81 is transmitted to the output shaft 84.

When the slits in the encoder disk 91 coaxially provided with the output shaft 84 are detected, the encoder detector 92 generates a pulse period, thereby detecting the rotation speed of the output shaft 84. In FIG. 4, the encoder detector 92 is indicated simply as an encoder.

The pulse period is input to the motor control circuit 41. The controller 42 generates a drive signal and transmits the drive signal to the driver 43 so as to make the pulse period constant.

Accordingly, when the pulse output of the encoder detector 92 is input to the motor control circuit 41 and the speed of rotation of the motor 81 is controlled so as to achieve the target constant speed of rotation of the photoreceptor drum 20, the constant rotation speed of the photoreceptor drum 20 can be reliably maintained even if the diameter and the shape of the peripheral surface 86*a* of the drive shaft 86 and the peripheral surface 85*a* of the wheel 85 vary due to machining inaccuracy and/or abrasion.

Referring back to FIG. 3B, a description is provided of the pressure regulator 88. FIG. 3B is a front view of the pressure regulator 88. As illustrated in FIG. 3B, the pressure regulator 88 includes the pressure rollers 87*a*, a pressure arm 95, a shaft 96, a spring 97, and a screw 98.

The pressure arm 95 serves as a bracket that supports the pressure rollers 87*a*. The shaft 96 swingably supports the pressure arm 95 relative to the second side plate 89*b* and serves as a fulcrum point of the pressure arm 95.

One end of the spring 97 contacts and urges the pressure arm 95 against the center of the drive shaft 96 such that the pressure rollers 87*a* press against the drive shaft 86. As a result, the drive shaft 86 presses against the peripheral surface 85*a*. The screw 98 positions the spring 97.

Each of the pressure rollers 87*a* includes a shaft 87*a*1 made of metal thermally processed, that is, quenched and tempered. The shafts 87*a*1 are supported by the pressure arm 95 and rotatably support the pressure rollers 87*a*. The pressure rollers 87*a* may include generally known ball bearings or needle roller bearings.

The peripheral surfaces of the pressure rollers 87*a* are parallel to the center of rotation of the drive shaft 86 and contact the drive shaft 86 by sandwiching the drive shaft 86 therebetween. The pressure rollers 87*a* contact the drive shaft 86 at two places opposite the peripheral surface of the drive shaft 86 facing the wheel 85. Accordingly, the drive shaft 86 is supported at three places including the place where the drive shaft 86 contacts the wheel 85, thereby preventing misalignment of the drive shaft 86.

The contact points where the pressure rollers 87*a* contact the drive shaft 86 are symmetrically positioned relative to a straight line connected from the center of rotation of the drive shaft 86 to the center of rotation of the wheel 85, so that a resultant pressure force of the pressure rollers 87*a* pressing the drive shaft 86 against the peripheral surface 85*a* is a direction of the drive shaft 86 moving towards the center of rotation of the wheel 85.

Accordingly, the pressure force generated at the contact points of the pressure rollers 87*a* negates a moving force that causes the drive shaft 86 to move in a direction intersecting the straight line. Thus, the drive shaft 86 can be positioned with precision and is pressed straight against the wheel 85.

The other end of the spring 97 contacts one end of the screw 98. A tip portion of the screw 98 is screwed into the second side plate 89b serving as a bracket. Therefore, by adjusting the screw 98 relative to the second side plate 89b, the pressure force of the pressure rollers 87a by the spring 97 relative to the drive shaft 86 can be adjusted, thus adjusting the pressure of the drive shaft 86 against the wheel 85 and the frictional force therebetween.

Figure 5:
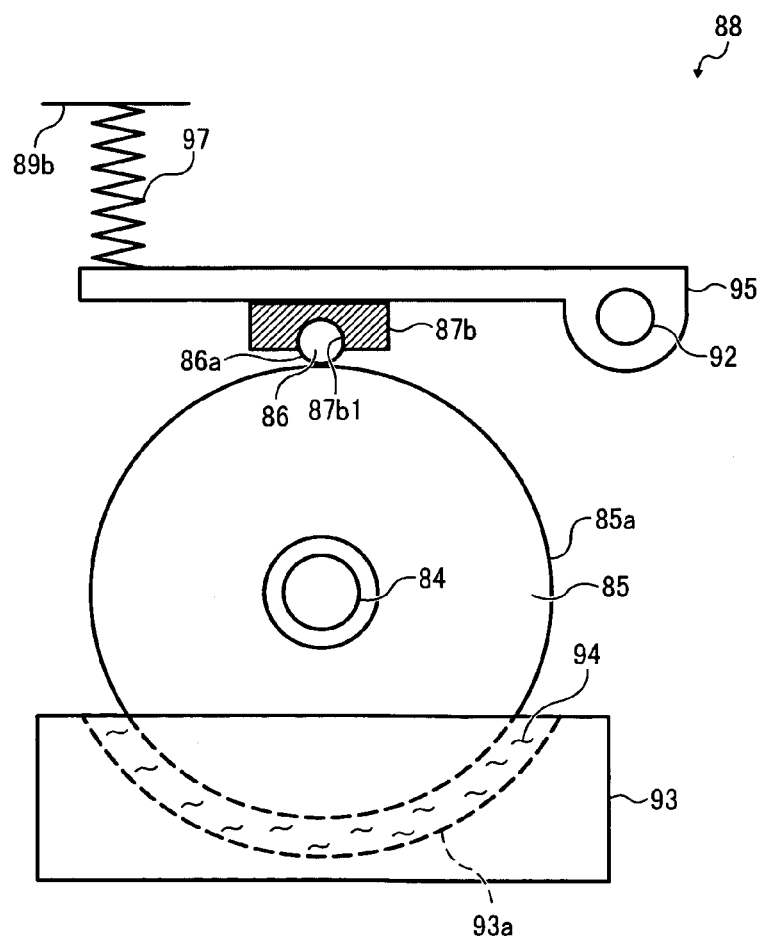
FIG. 5 is a front view of a variation of a pressure regulator provided to the decelerator according to illustrative embodiment of the present invention.

Referring now to FIG. 5, there is provided a schematic diagram illustrating a variation of the foregoing embodiment. It is to be noted that the same reference numerals will be given to constituent elements such as parts and materials having the same functions, and redundant descriptions thereof omitted.

In this variation, the pressure regulator 88 includes a support member 87b in place of the pressure rollers 87a. The support member 87b serves as an alignment regulator that supports the drive shaft 86. The support member 87b contacts and supports the drive shaft 86 at the side opposite the surface of the drive shaft 86 contacting the wheel 85 so that the point of contact with the drive shaft 86 is formed at least at the peripheral surface of the drive shaft 86 opposite the wheel 85, thereby causing the drive shaft 86 to contact the wheel 85.

The support member 87b includes a fitting portion 87b1 which is a recessed portion. The drive shaft 86 is fitted to the fitting portion 87b1 so as to position the drive shaft 86.

The support member 87b also serves as a pressure member that presses the drive shaft 86 against the wheel 85 using the pressure force of the spring 97. The support member 87b allows the drive shaft 86 to slidably move within the fitting portion 87b.

It is preferable that the material for the support member 87b includes resin or metal that is generally used in a shaft bearing. In particular, the material includes, but is not limited to, a resin material such as polyacetal, nylon, Teflon®, and so forth, or a metal material such as oil-impregnated sintered metal.

It is to be noted that it is important to reliably fix the drive shaft 86 so as not to shift in a direction of a tangent to the peripheral surface 85a at the contact point of the wheel 85 even if the support member 87b is abraded.

Figure 6A:
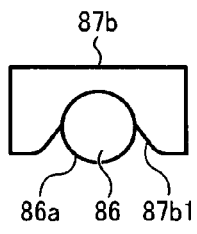
FIG. 6A through 6C are front views of variations of a support member provided to the pressure regulator according to an illustrative embodiment of the present invention.
Figure 6B:
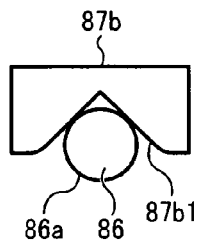
Figure 6C:
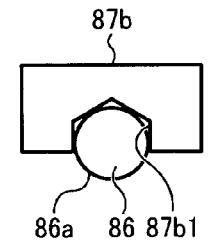

Referring now to FIG. 6A through FIG. 6C, there are provided front views of variations of the fitting portion 87b1.

FIG. 6A illustrates the fitting portion 87b1 having a U-shape groove formed in the support member 87b. With this configuration, because the point of contact with the drive shaft 86 is a surface and relatively wide, it is advantageous in terms of abrasion resistance.

FIG. 6B illustrates the fitting portion 87b1 having a V-shape groove formed in the support member 87b. The point of contact with the drive shaft 86 is smaller than that of the configuration shown in FIG. 6A. However, with this configuration, even if the fitting portion 87b1 is abraded, the position of the drive shaft 86 is secured.

FIG. 6C illustrates the fitting portion 87b1 having a polygonal shape formed in the support member 87b. In particular, the fitting portion 87b1 is a groove having a home-base-like shape. With this configuration, there are more points of contact than in the configuration shown in FIG. 6B. Accordingly, contact pressure is dispersed at each point of contact, thereby enhancing abrasion resistance.

In the pressure regulator 88 according to the foregoing embodiments, the point of contact where the alignment regulator and the drive shaft 86 meet is not limited two places as illustrated in FIG. 3. Alternatively, as illustrated in FIG. 6C, the number of places where the alignment regulator and the drive shaft 86 meet can be more than three places. Furthermore, as illustrated in FIG. 6A, the point of contact can be a surface.

As described above, it is preferable that the point of contact is provided at a position symmetrical to the straight line connecting the center of rotation of the drive shaft 86 and the center of rotation of the wheel 85.

The oil storage 93 holds the oil 94 that lubricates the drive shaft 86 and the wheel 85, and the drive shaft 86 and the pressure rollers 87a or the support member 87b.

In order to achieve stiffness and durability, and to transmit the rotation smoothly, the drive shaft 86, the wheel 85, the pressure rollers 87a, and the support member 87b are formed of metal that is quenched and tempered as described above. Thus, these parts must be lubricated.

The rim of the wheel 85 is always immersed in the oil 94 in the oil storage 93. As the wheel 85 rotates, the point of contact where the wheel 85 and the drive shaft 86 meet is supplied with the oil 94 by the wheel 85. As the drive shaft 86 rotates, the point of contact where the drive shaft 86 meets the pressure rollers 87a or the support member 87b is supplied with the oil 94.

As the oil 94, a generally known industrial oil can be used. In this illustrative embodiment, a generally known traction oil known as a drive oil for friction transmission is used.

Traction oil is a lubricant that tends to be vitrified under extreme pressure. Under extreme pressure, a coefficient of friction is maintained at approximately 0.1. Therefore, the traction oil is good in increasing torque at the beginning of slip and thus suitable for transmission of drive caused by friction between the drive shaft 86 and the wheel 85. When using traction oil, the coefficient of friction at high pressure increases by 50% compared with the coefficient of friction when using normal oil, thereby increasing transmittable torque by 50%.

A description is now provided of a relation between transmission of torque and contact pressure. When a torque of 1 N·m (approximately 10 Kg·cm) is transmitted using the wheel 85 having a diameter of 60 mm, a frictional force of 1/0.03=33.3N is needed at the contact portion where the drive shaft 86 and the wheel 85 meet and press against each other. The frictional force is a product of a pressure force and a friction coefficient μ. Therefore, when traction oil is used as the oil 94, the torque can be transmitted when the pressure force is equal to or greater than 33.3/0.1=333N (approximately 33.3 Kg).

In the case of a small torque, when the shaft diameter of the drive shaft 86 is approximately 1 mm, it is sufficient to drive the wheel 85. When the diameter of the drive shaft 86 is 1 mm and the ratio of speed reduction is 1/20, the diameter of the wheel 85 is 20 mm, thereby reducing the size of the decelerator 82.

If the shaft diameter of the drive shaft 86 is 4 mm, the diameter of the wheel 85 falls within 80 mm when the ratio of speed reduction is 1/20. Accordingly, when a space between the photoreceptor drums 20 is approximately 100 mm, there is enough space for the space reducer 82 for each photoreceptor drum 20.

It is to be noted that, in general, the diameter of the photoreceptor drums 20 is approximately 30 mm to 60 mm, and the space between the photoreceptor drums 20 is approximately 70 mm to 100 mm so that the developing device and the cleaning device can be provided to each of the photoreceptors 20. Therefore, even if the shaft diameter of the drive shaft 86 is 4 mm, enough space for the space reducer 82 can be secured for each of the photoreceptor drums 20.

A description is now provided of operation of the driving unit 80. When the motor 81 serving as the drive source is driven, the drive shaft 86 starts to rotate. The drive shaft 86 is pressed against the wheel 85 while the pressure regulator 88 regulates undesirable drift of the drive shaft 86 in the circumference direction of the wheel 85 as well as in the direction of rotation. Accordingly, the drive is transmitted.

Subsequently, the wheel 85 is rotated by the drive force, and the output shaft 84 rotatably supported by the bearings 90 is rotated, thereby rotating the shaft 21 through the coupling 83, and the photoreceptor drum 20. The peripheral surface 85a, that is, a drive transmission surface of the wheel 85 is lubricated with the oil 94 in the oil storage 93.

Rotation of the encoder disk 91 provided on the output shaft 84 is read by the encoder detector 92 so as to detect fluctuation in the rotation of output shaft 84. The motor control circuit 41 performs the feedback control so that the fluctuation in the rotation of the output shaft 84 detected by the encoder detector 92 is negated.

Since the decelerator 82 does not use a gear, backlash due to the gear teeth can be prevented. Furthermore, according to the illustrative embodiments, the pressure regulator 88 secures friction between the drive shaft 86 and the wheel 85 so that it is not necessary to press the drive shaft 86 and the wheel 85 against each other by adjusting the position of the drive shaft 86 and the wheel 85. Accordingly, fluctuation in rotation can be prevented and drive can be transmitted without irregular rotation. In addition, the pressure regulator 88 does not employ the planetary roller, thereby reducing the size of the device as a whole.

For comparison, with reference to FIGS. 7 and 8, a description is provided of occurrence of irregular rotation of the photoreceptor drum 20 using a related-art decelerator using a gear and the decelerator 82 according to the illustrative embodiment.

Figure 7A:
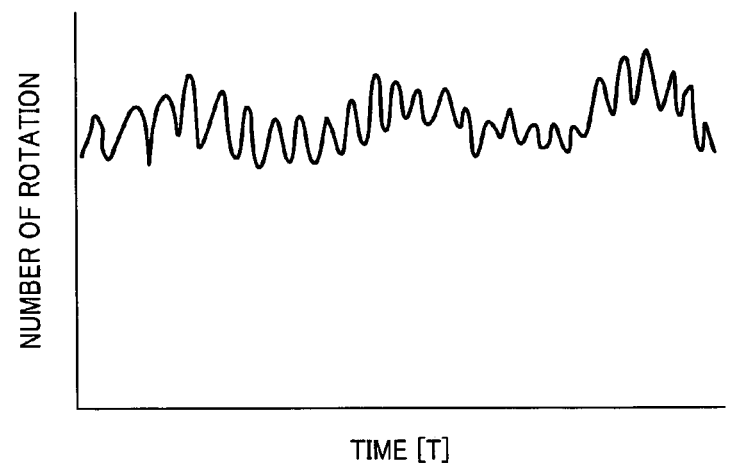
FIG. 7A is a graph showing fluctuation in a speed of rotation along a time axis according to a related-art decelerator.
Figure 7B:
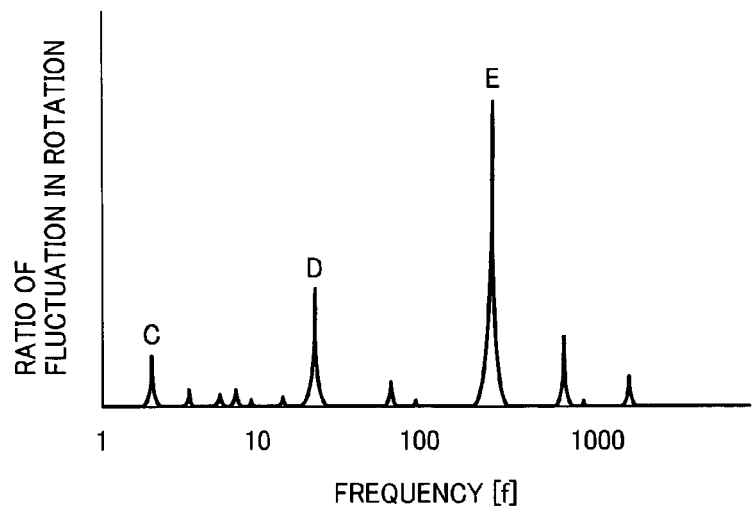
FIG. 7B is a graph showing a frequency analysis of irregular rotation according to the related-art decelerator.

FIGS. 7A and 7B show a graphical representation of occurrence of irregular rotation when using the related-art decelerator using a single speed reduction gear. FIG. 7A is a graph showing fluctuation in the speed of rotation along a time axis. FIG. 7B is a graph showing a frequency analysis of irregular rotation.

Figure 8A:
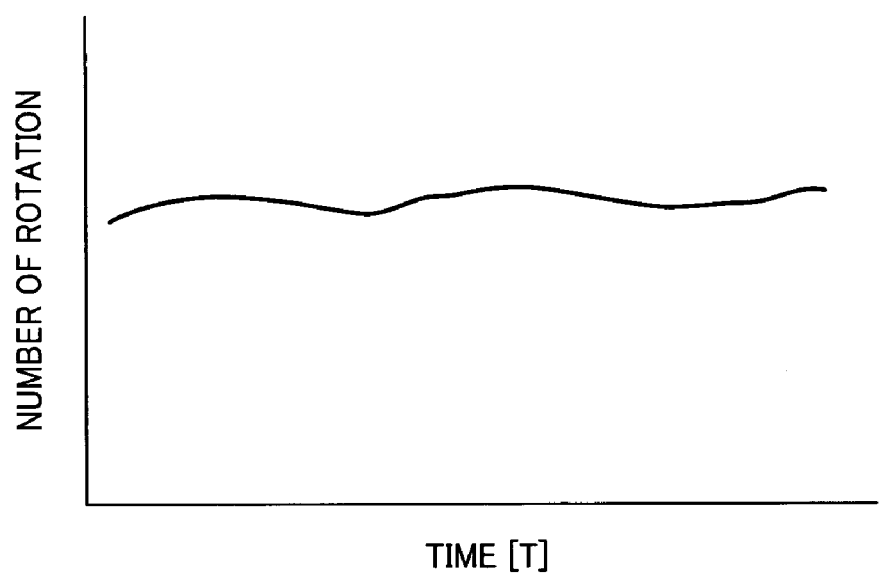
FIG. 8A is a graph showing fluctuation in the speed of rotation along a time axis according to an illustrative embodiment of the present invention.
Figure 8B:
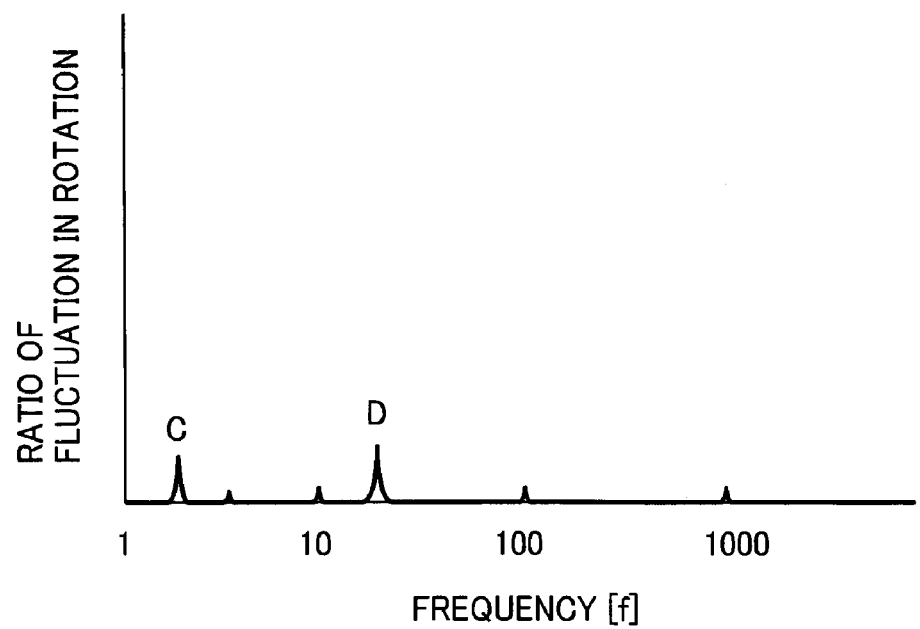
FIG. 8B is a graph showing a frequency analysis of irregular rotation according to an illustrative embodiment of the present invention.

FIGS. 8A and 8B show a graphical representation of occurrence of irregular rotation when using the decelerator 82 according to the illustrative embodiment. FIG. 8A is a graph showing fluctuation in the speed of rotation along a time axis. FIG. 8B is a graph showing a frequency analysis of irregular rotation.

In the case of the related-art decelerator using the gear, as can be understood from FIG. 7A, vibration occurs at each gear tooth. As illustrated in 7B, irregular rotation occurs at C through E, and at a high frequency. In FIG. 7B, C indicates one rotation cycle of the shaft of the photoreceptor drum. D indicates one rotation cycle of the motor shaft. E indicates one rotation cycle of a gear tooth.

By contrast, when using the decelerator 82, as can be understood from FIG. 8B, irregular rotation of the gear indicated as E in FIG. 7B, that is, fluctuation of rotation of the pitch of the gear tooth does not exist. Furthermore, irregular rotation indicated as C and D in FIG. 7B is also reduced in FIG. 8B due to improvement on circularity of the drive shaft 86 and the wheel 85, and a flywheel effect generated by the rotor of the motor 81. Thus, when using the decelerator 82, stable operation is achieved.

A description is now provided of the flywheel effect by the rotor of the motor 81.

Generally, the flywheel is configured to rotate together with a driven member such as the photoreceptor drum. When the rotation speed of the driven member fluctuates, it is natural that the rotation speed of the flywheel also fluctuates. However, the moment of inertia of the flywheel is configured to be relatively large so as to operate as a brake against such fluctuation. Therefore, fluctuation in rotation speed of the driven member is also suppressed. This is commonly known as the flywheel effect.

In general, the gear teeth of the gear in the decelerator require backlash. Normally, rotation of the motor is accurately transmitted to the driven member such as the photoreceptor drum. However, when some stress is applied to the driven member and/or an external force accelerates rotation of the driven member, the backlash prevents transmission of rotation of the motor to the driven member, causing the driven member to freely move. Therefore, in the decelerator using the gear, the moment of inertia of the rotor of the motor does not operate as the flywheel.

By contrast, according to the illustrative embodiment, as described above, the decelerator 82 does not employ a gear, and the drive transmission portions frictionally contact each other so that there is no backlash. Therefore, even if an external force is applied to the driven portion, thus changing a rotation angle thereof, fluctuation in rotation of the driven portion does not occur unless the rotor of the motor 81 is rotated by a speed increase ratio which is the inverse of the reduction ratio.

When compared with the moment of inertia of a normal flywheel, the moment of inertia of the rotor is relatively small. However, the moment of inertia of the rotor is a square value of the speed increase ratio of the motor. For example, when the speed increase ratio of the motor is 10 times, the moment of inertia of the rotor becomes 100 times. When the speed increase ratio of the motor is 20 times, the moment of inertia of the rotor becomes 400 times. Therefore, the rotor can still achieve the same effect as that of a generally-known large flywheel when the rotation of the motor is controlled with accuracy and maintained while preventing uneven rotation.

With reference to FIGS. 9 through 24, variations of the decelerator 82 are provided. It is to be noted that the same reference numerals will be given to constituent elements such as parts and materials having the same functions, and redundant descriptions thereof omitted when discrimination therebetween is not required.

Figure 9A:
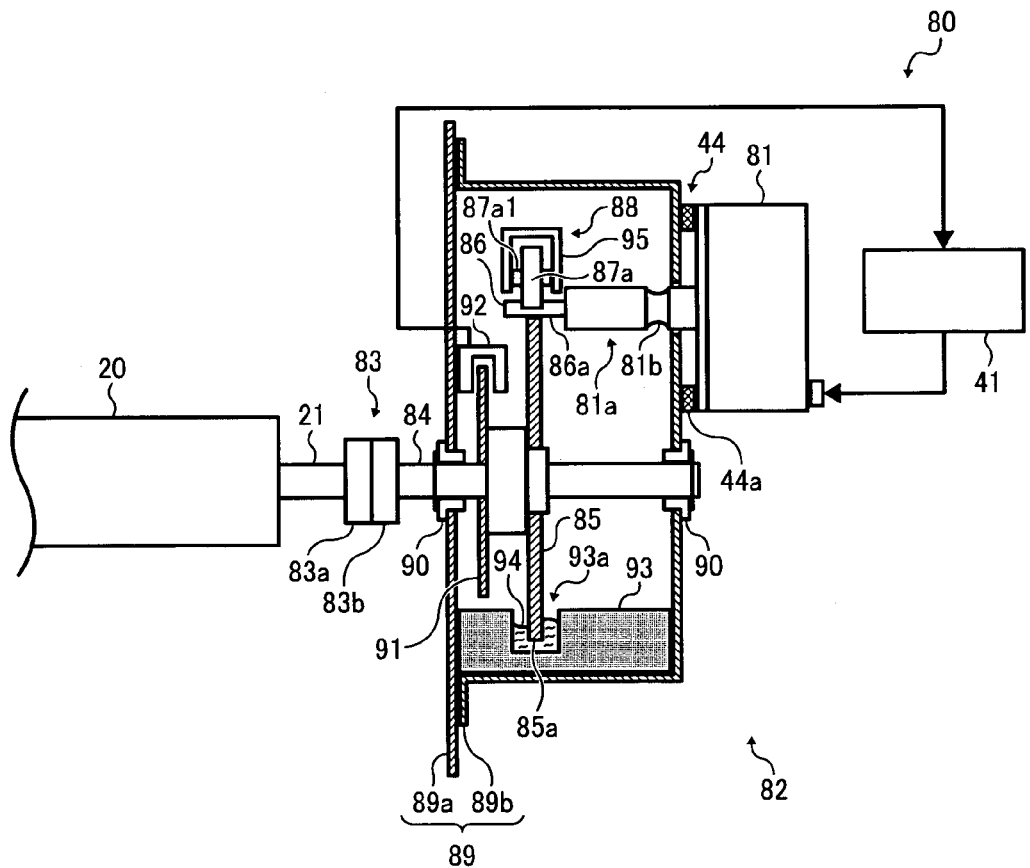
FIG. 9A is a cross-sectional view of a variation of the decelerator shown in FIG. 3A.
Figure 9B:
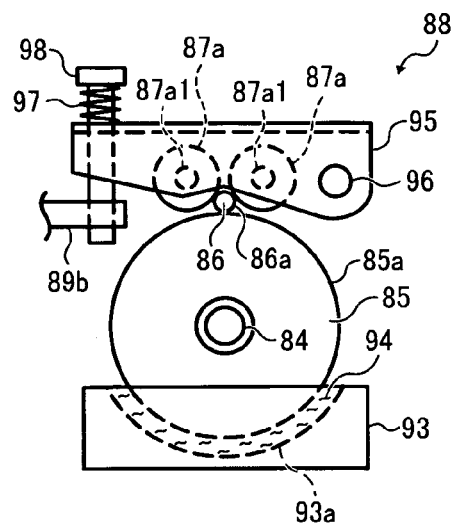
FIG. 9B is a front view of the pressure regulator of the decelerator of FIG. 9A.

With reference to FIGS. 9A and 9B, a description is provided of a variation of the decelerator 82 shown in FIGS. 3A and 3B. FIG. 9A is a cross-sectional view of variation of the decelerator 82 shown in FIG. 3A. FIG. 9B is a front view of the pressure regulator 88 of the decelerator 82 of FIG. 9A. In FIG. 3A, the motor 81 of the decelerator 82 is fixedly supported. By contrast, as illustrated in FIG. 9A, the motor 81 of the decelerator 82 is movably supported.

In particular, the motor 81 of the decelerator 82 illustrated in FIG. 3A is fixedly supported by the second side plate 89b which is stationary. By contrast, the decelerator 82 illustrated in FIG. 9A includes a movable member 44 that movably supports the motor 81 relative to the second side plate 89b.

As will be later described, there are variations of the movable member 44. However, an object of the movable member 44 is similar to, if not the same as that of the U-shape groove portion 81b provided to the motor shaft 81a. In other words, the movable member 44 is provided to absorb bending stress applied to the drive shaft 86 and the motor shaft 81a.

There is a possibility that the position of the drive shaft 86 and the motor shaft 81a may slightly fluctuate due to a margin of error in the diameter of the drive shaft 86 and the motor shaft 81a as well as abrasion, causing the drive shaft 86 and the motor shaft 81a to rotate out of the original center of rotation. When this happens and the bending stress is exerted onto the drive shaft 86 and the motor shaft 81, the movable member 44 is configured to move the motor 81 so as to absorb the stress.

Accordingly, the drive shaft 86 and the motor shaft 81a are prevented from getting damaged, and fluctuation in frictional force between the drive shaft 86 and the wheel 85 is reduced, thereby reliably keeping the drive shaft 86 contacting the wheel 85.

The movable member 44 illustrated in FIG. 9A includes a rubber 44a as an elastic member. The motor 81 is supported by the second side plate 89b through the rubber 44a so that the motor 81 is movable relative to the second side plate 89b. The rubber 44a has a ring-shape and is sandwiched between the motor 81 and the second side plate 89b. The motor 81 is fastened by a screw, not illustrated. An installation method for the motor 81 is not limited to this. Alternatively, the motor 81 is adhered to the rubber 44a that is adhered to the second side plate 89b.

Because the movable member 44 includes the rubber 44a, when the bending stress is applied, the rubber 44a deforms, absorbing the stress and causing the position of the motor 81 to change. Accordingly, the drive shaft 86 and the motor shaft 81a are prevented from getting damaged, and fluctuation in frictional force between the drive shaft 86 and the wheel 85 is reduced, thereby reliably keeping the drive shaft 86 contacting the wheel 85.

Figure 10A:
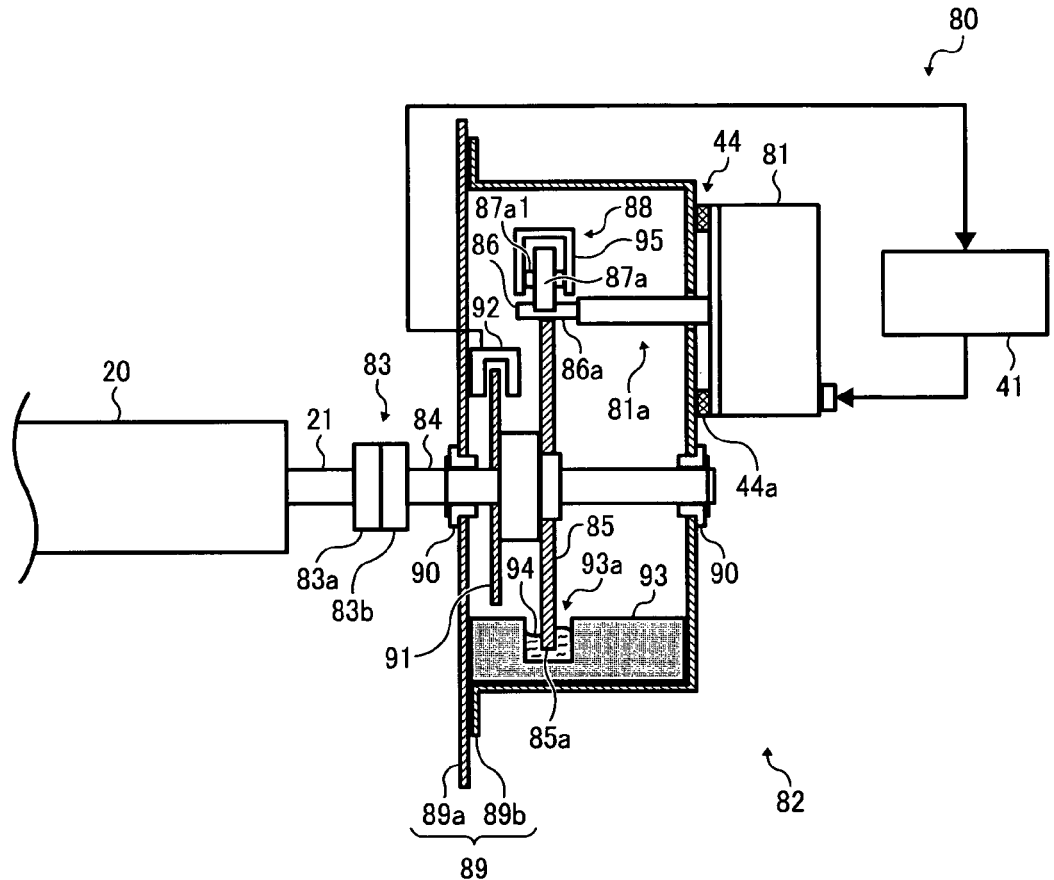
FIG. 10A is a cross-sectional view of a variation of the decelerator shown in FIG. 9A.
Figure 10B:
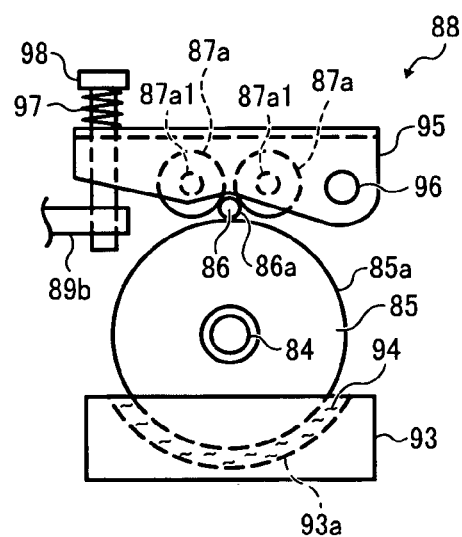
FIG. 10B is a front view of the pressure regulator of the decelerator of FIG. 10A.

With reference to FIGS. 10A and 10B, a description is provided of a variation of the decelerator 82 shown in FIGS. 9A and 9B. FIG. 10A is a cross-sectional view of a variation of the decelerator 82 shown in FIG. 9A. FIG. 10B is a front view of the pressure regulator 88 of the decelerator 82 of FIG. 10A. The decelerator 82 illustrated in FIG. 10A includes the movable member 44 of FIG. 9A and the motor shaft 81a having a shape different from that of FIG. 9A.

In particular, the motor shaft 81a illustrated in FIG. 10A does not include the groove portion 81b. Instead, the diameter of the entire motor shaft 81a is reduced. When the bending stress is exerted thereto, the entire motor shaft 81a elastically deforms so as to absorb the stress. Accordingly, fluctuation in frictional force between the drive shaft 86 and the wheel 85 is reduced, thereby reliably keeping the drive shaft 86 contacting the wheel 85.

Figure 11A:
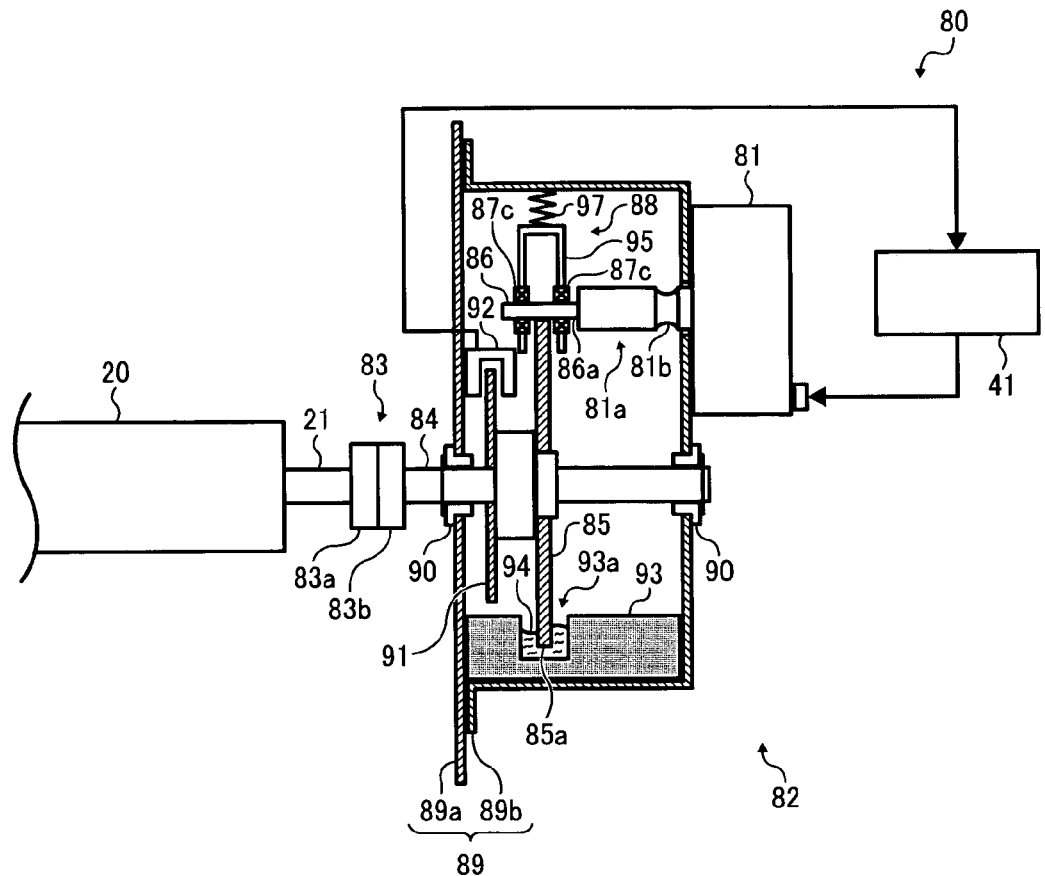
FIG. 11A is a cross-sectional view of a variation of the decelerator shown in FIG. 3A.
Figure 11B:
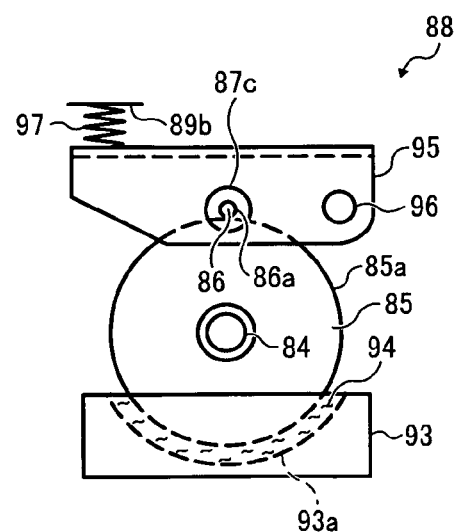
FIG. 11B is a front view of the pressure regulator of the decelerator of FIG. 11A.

With reference to FIGS. 11A and 11B, a description is provided of a variation of the decelerator 82 shown in FIGS. 3A and 3B as well as FIG. 5. FIG. 11A is a cross-sectional view of a variation of the decelerator 82 shown in FIG. 3A and FIG. 5. FIG. 11B is a front view of the pressure regulator 88 of the decelerator 82 of FIG. 11A.

The pressure regulator 88 illustrated in FIGS. 3 and 5 includes the pressure rollers 87a or the support member 87b each of which serves as an alignment regulator that slidably contacts and engages the drive shaft 86. By contrast, as illustrated in FIG. 11A, the pressure regulator 88 includes shaft bearings 87c that are fitted to the drive shaft 86 and rotatably support the drive shaft 86 relative to the pressure arm 95.

In FIG. 11A, the shaft bearings 87c rotatably support the drive shaft 86 at both sides of the wheel 85 in the shaft direction of the drive shaft 86. With this configuration, the drive shaft 86 is supported at both sides of the wheel 85 and pressed against the peripheral surface 85a, thereby enhancing transmission of drive through friction in the entire shaft direction. Furthermore, because no alignment regulator slidably contacts the drive shaft 86, stress against the drive shaft 86 is reduced.

Since the drive shaft 86 is formed of a shaft member having a reduced diameter, the drive shaft 86 may be deformed and/or damaged due to the bending moment when pressing against the wheel 85. Thus, it is preferable that the space between the shaft bearings 87c is configured as small as possible. For the shaft bearings 87c, a generally-known ball bearing, a needle shaft bearing, and so forth can be used.

Figure 12A:
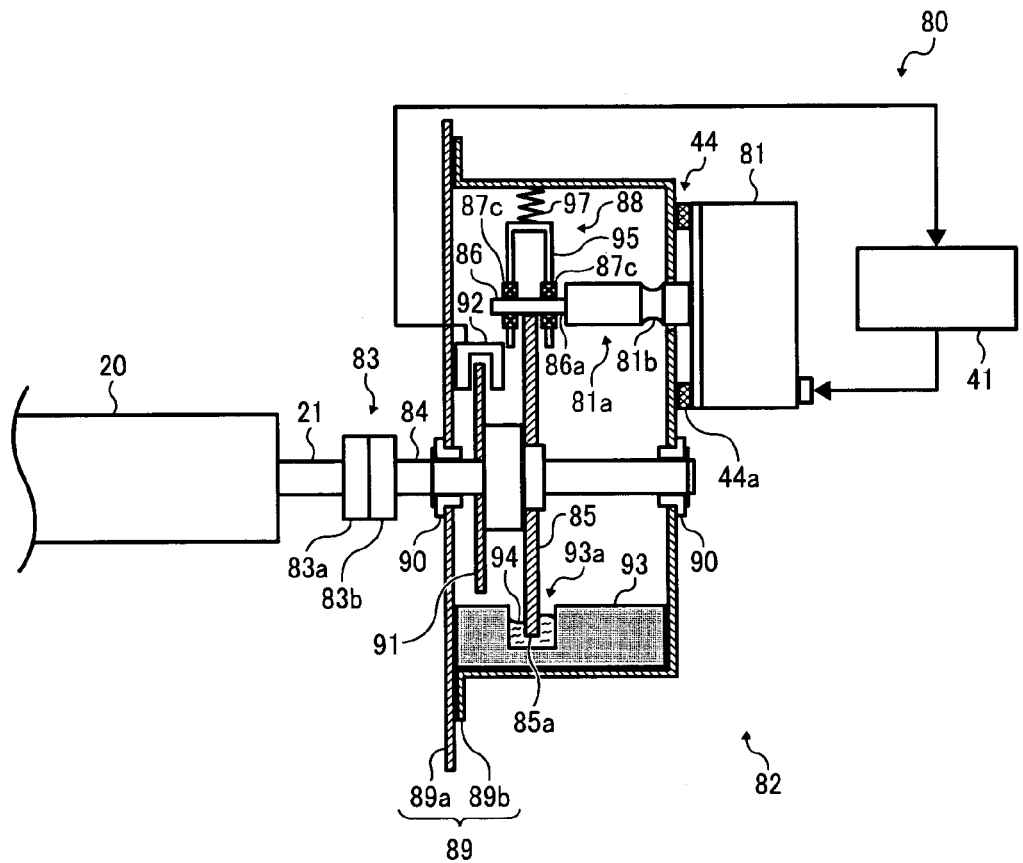
FIG. 12A is a cross-sectional view of a variation of the decelerator shown in FIG. 11A.
Figure 12B:
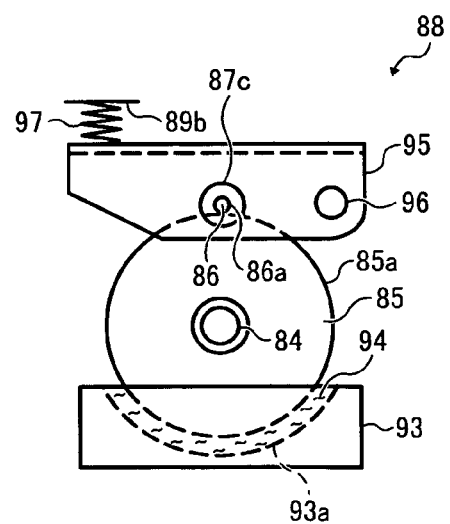
FIG. 12B is a front view of the decelerator of the pressure regulator shown in FIG. 12A.

FIG. 12A is a cross-sectional view of another variation of the decelerator 82 shown in FIG. 11A. FIG. 12B is a front view of the decelerator 82 of the pressure regulator 88 shown in FIG. 12A. According to the present embodiment, the decelerator 82 includes the pressure regulator 88 using the shaft bearings 87c of FIG. 11A and the movable member 44 of FIG. 9A, thereby appreciating both functions of the pressure regulator 88 and the movable member 44 at the same time.

Figure 13A:
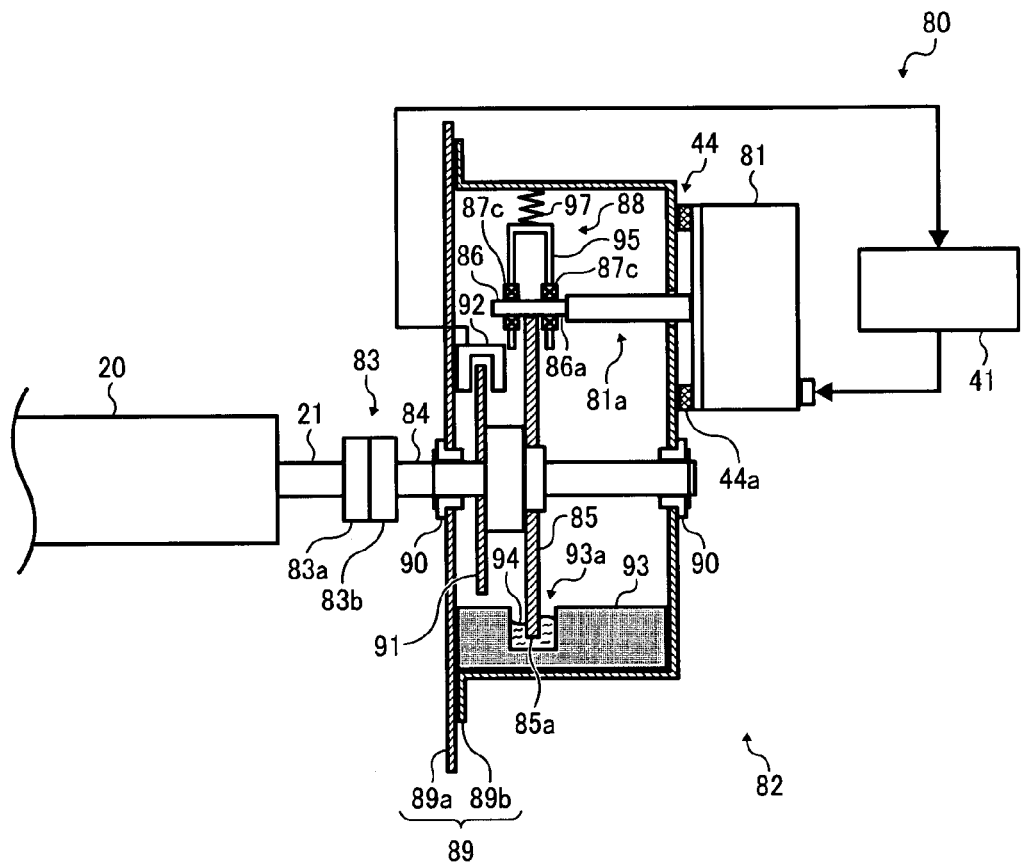
FIG. 13A is a cross-sectional view of a variation of the decelerator shown in FIG. 12A.
Figure 13B:
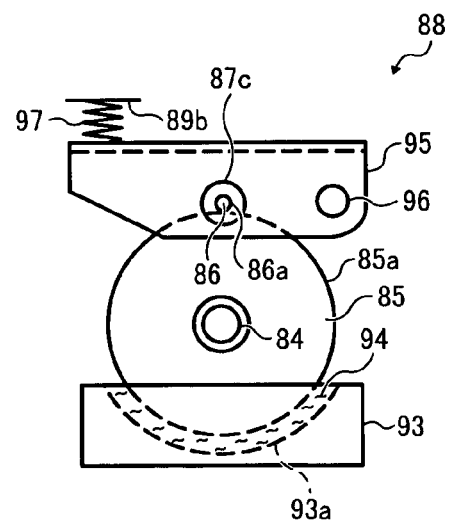
FIG. 13B is a front view of the pressure regulator of the decelerator of FIG. 13A.

FIG. 13A is a cross-sectional view of a variation of the decelerator 82 shown in FIG. 12A. FIG. 13B is a front view of the pressure regulator 88 of the decelerator of FIG. 13A. According to the present embodiment, the decelerator 82 includes the motor shaft 81a having a reduced diameter instead of the groove portion 81b. According to the present embodiment, the diameter of the entire motor shaft 81a is reduced so that the entire motor shaft 81a is flexible.

Figure 14A:
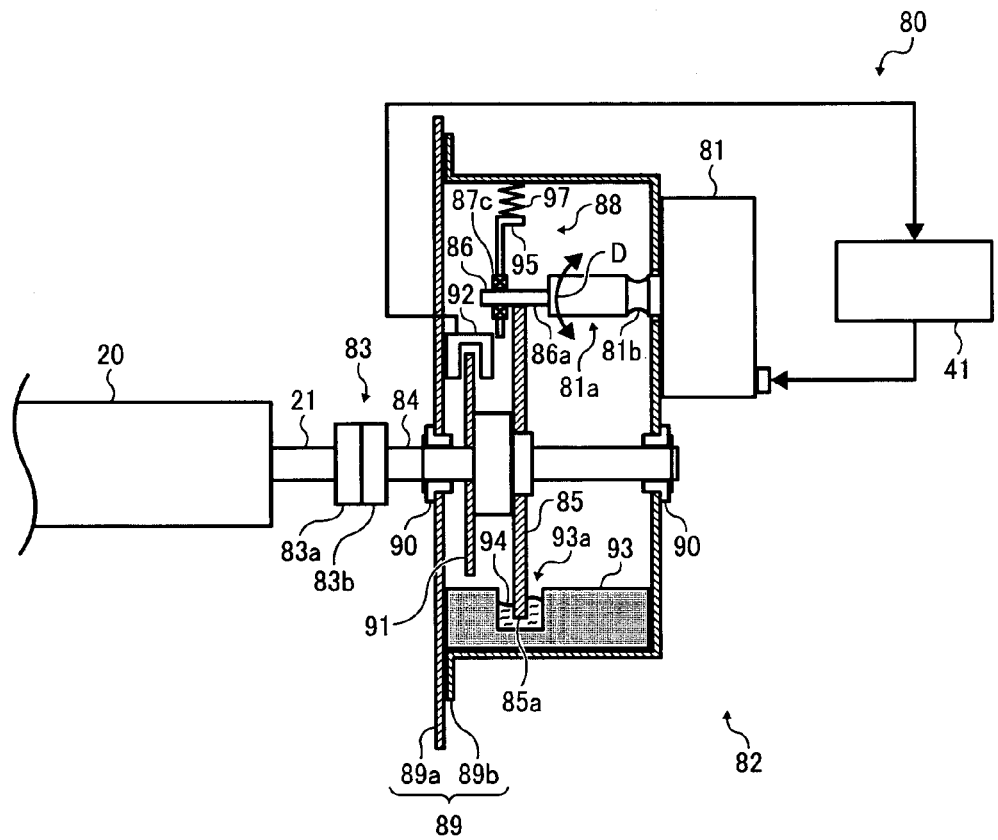
FIG. 14A is a cross-sectional view of a variation of the decelerator shown in FIG. 11A.
Figure 14B:
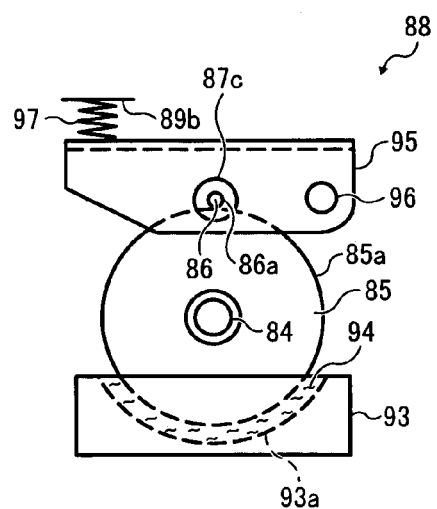
FIG. 14B is a front view of the pressure regulator of the decelerator of FIG. 14A.

FIG. 14A is a cross-sectional view of a variation of the decelerator 82 shown in FIG. 11A. FIG. 14B is a front view of the pressure regulator 88 of the decelerator 82 of FIG. 14A.

According to the present embodiment, the pressure regulator 88 includes the shaft bearing 87c that supports the drive shaft 86 at one side of the wheel 85 opposite the surface facing the motor 81 in the shaft direction of the drive shaft 86. In other words, the drive shaft 86 is rotatably supported and cantilevered by the shaft bearing 87c.

With this configuration, the size of the pressure regulator 88 is reduced compared with supporting the drive shaft 86 at two sides as illustrated in FIG. 11A, thereby also reducing the size of the decelerator 82 and the driving unit 80.

Furthermore, since the drive shaft 86 is cantilevered, the tip of the drive shaft 86 is slightly swingable in a direction indicated by arrow D at the motor 81. Consequently, when the above-described bending stress is applied, the stress can be absorbed, thereby reducing, if not preventing entirely, the drive shaft 86 and the motor shaft 81a from getting damaged and/or fluctuation in the frictional force between the drive shaft 86 and the wheel 85. Thus, the drive shaft 86 can reliably contact the wheel 85.

Alternatively, the drive shaft 86 can be supported at the opposite side. In other words, the shaft bearing 87c can support the drive shaft 86 at the motor 81 side relative to the wheel 85 in the shaft direction of the drive shaft 86. However, when the drive shaft 86 is cantilevered as illustrated in FIG. 14A, the bending stress can be accommodated well.

Figure 15A:
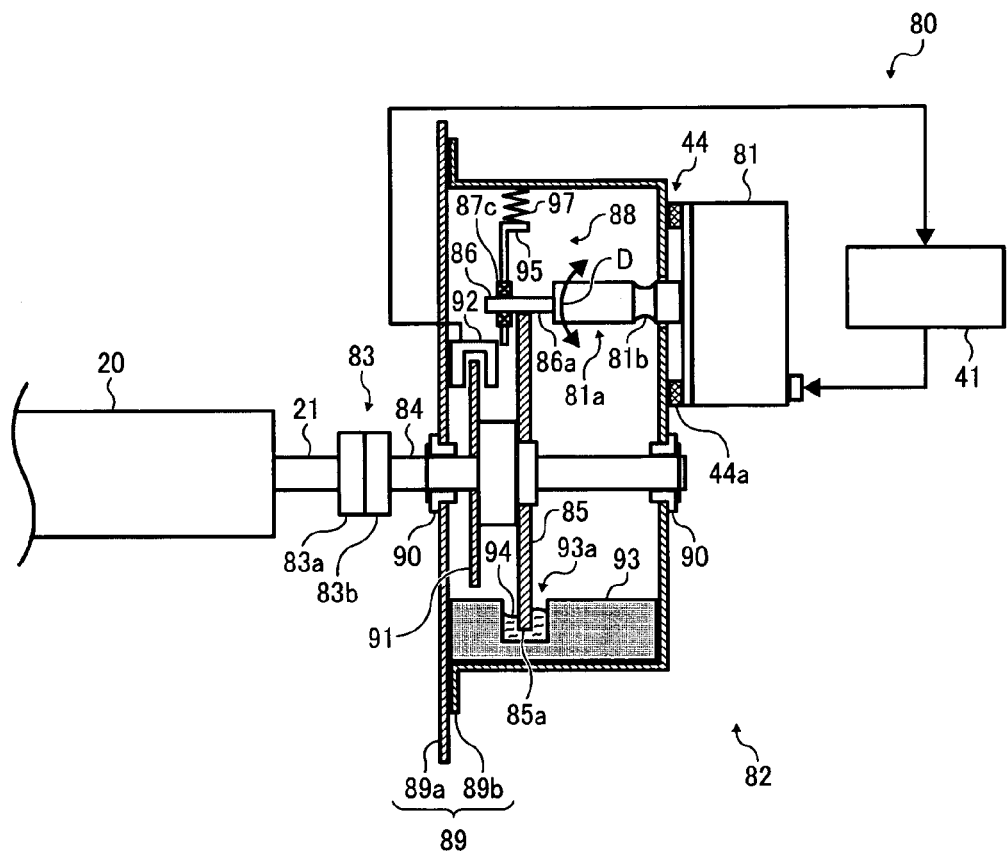
FIG. 15A is a cross-sectional view of a variation of the decelerator shown in FIG. 14A.
Figure 15B:
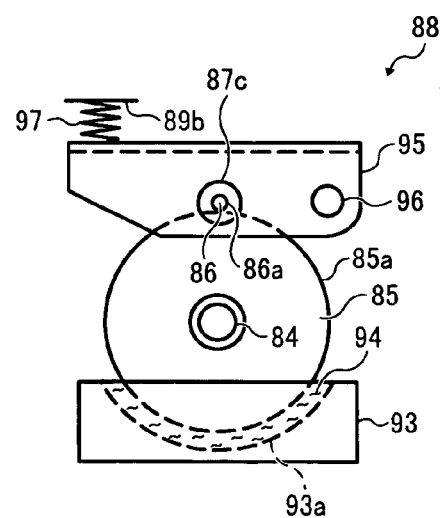
FIG. 15B is a front view of the pressure regulator of the decelerator of FIG. 15A.

FIG. 15A is a cross-sectional view of a variation of the decelerator 82 shown in FIG. 14A. FIG. 15B is a front view of the pressure regulator 88 of the decelerator 82 of FIG. 15A. According to the present embodiment, the decelerator 82 includes the pressure regulator 88 using the shaft bearing 87 illustrated in FIG. 14 and the movable member 44 illustrated in FIG. 9, thereby appreciating both functions at the same time.

Figure 16A:
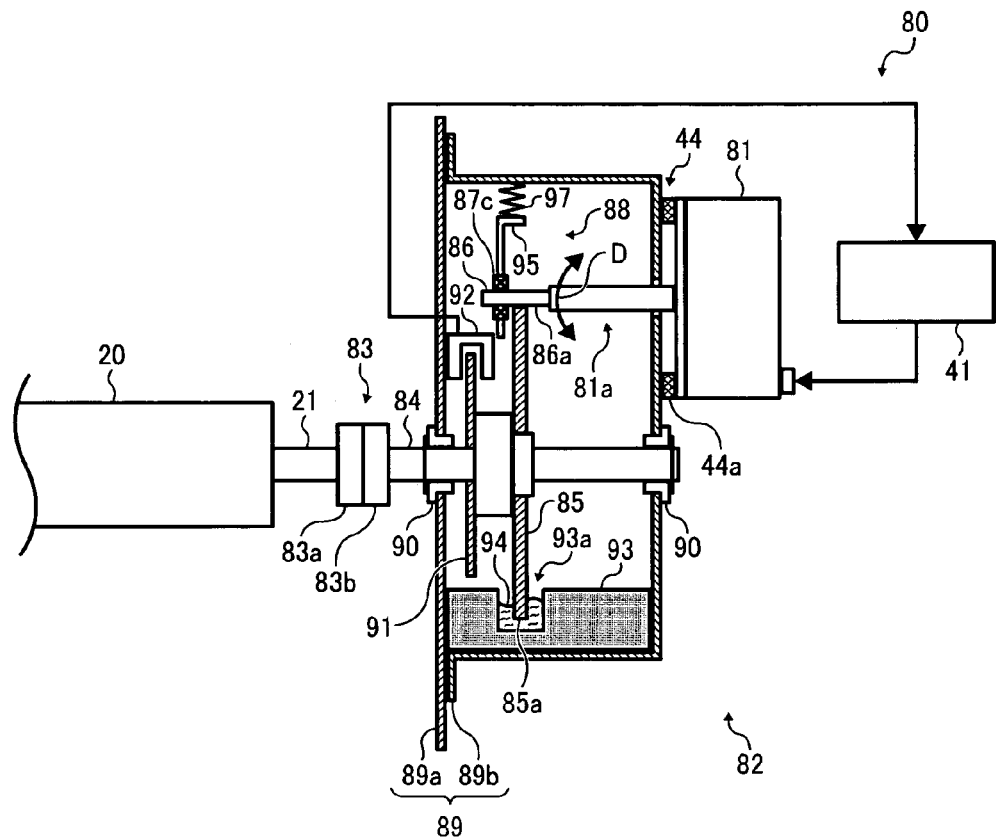
FIG. 16A is a cross-sectional view of a variation of the decelerator shown in FIG. 15A.
Figure 16B:
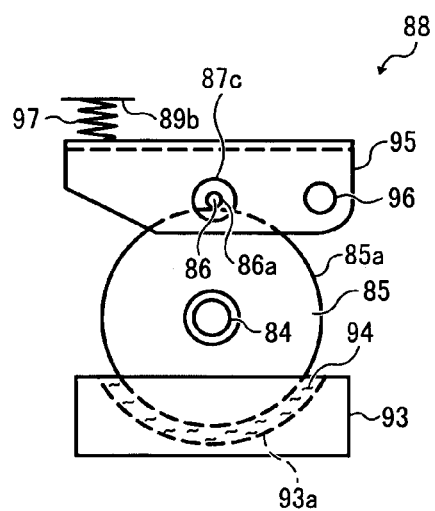
FIG. 16B is a front view of the pressure regulator of the decelerator of FIG. 16A.

FIG. 16A is a cross-sectional view of a variation of the decelerator 82 shown in FIG. 15A. FIG. 16B is a front view of the pressure regulator 88 of the decelerator of FIG. 16A. According to the present embodiment, the motor shaft 81a of the decelerator 82 does not include the groove portion 81b. The diameter of the entire motor shaft 81a is reduced so that the entire motor shaft 81a can be flexed.

Figure 17A:
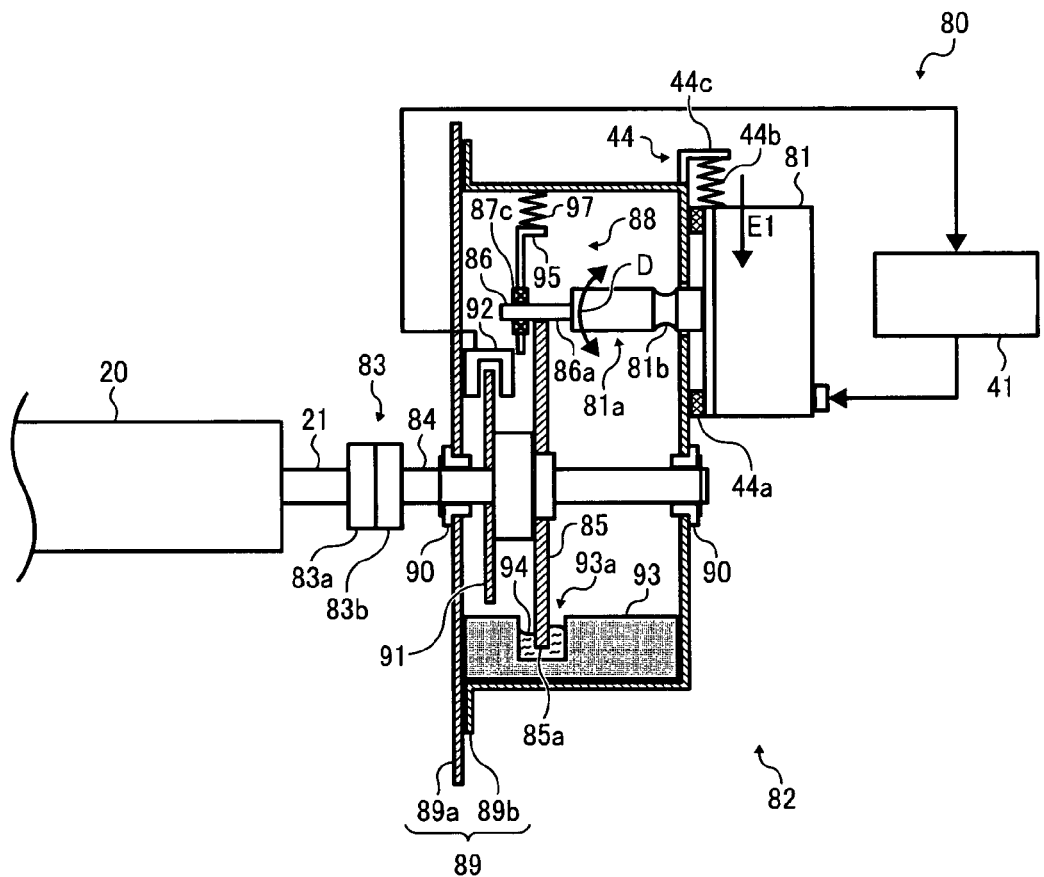
FIG. 17A is a cross-sectional view of a variation of the decelerator shown in FIG. 15A.
Figure 17B:
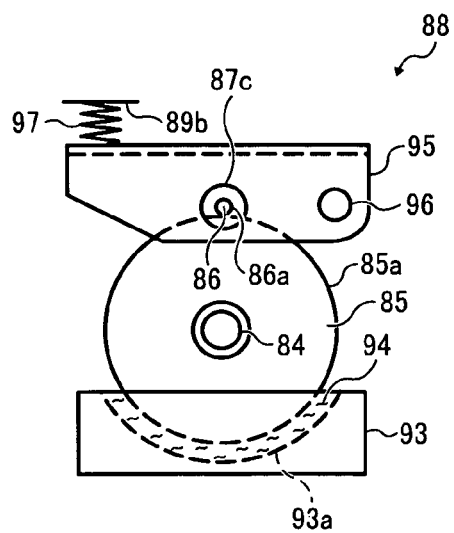
FIG. 17B is a front view of the pressure regulator of the decelerator of FIG. 17A.

FIG. 17A is a cross-sectional view of a variation of the decelerator 82 shown in FIG. 15A. FIG. 17B is a front view of the pressure regulator 88 of the decelerator 82 of FIG. 17A.

According to the present embodiment, the movable member 44 of the decelerator 82 includes the rubber 44a, a spring 44b, and a bracket 44c.

The spring 44b serving as an urging member that urges the motor 81 in a first direction indicated by arrow E1 that is a downward direction in which the pressure regulator 88 presses the drive shaft 86 against the wheel 85. The bracket 44c supports the spring 44b.

The rubber 44a allows the motor 81 to elastically move in the first direction indicated by arrow E1. Thus, when the spring 44b presses in the first direction E1, the drive shaft 86 is pressed against the peripheral surface 85a while improving parallelism in the shaft direction of the drive shaft 86 relative to the shaft direction of the wheel 85.

In order to enhance parallelism, the amount of the urging force of the spring 44b is configured large enough to generate a moment of rotation equilibrated with a moment of rotation of the urging force of the spring 97 about the contact point of the drive shaft 86 and the wheel 85. The spring 44b serves as an urging member provided to the pressure regulator 88 so as to press the drive shaft 86 against the wheel 85.

Figure 18A:
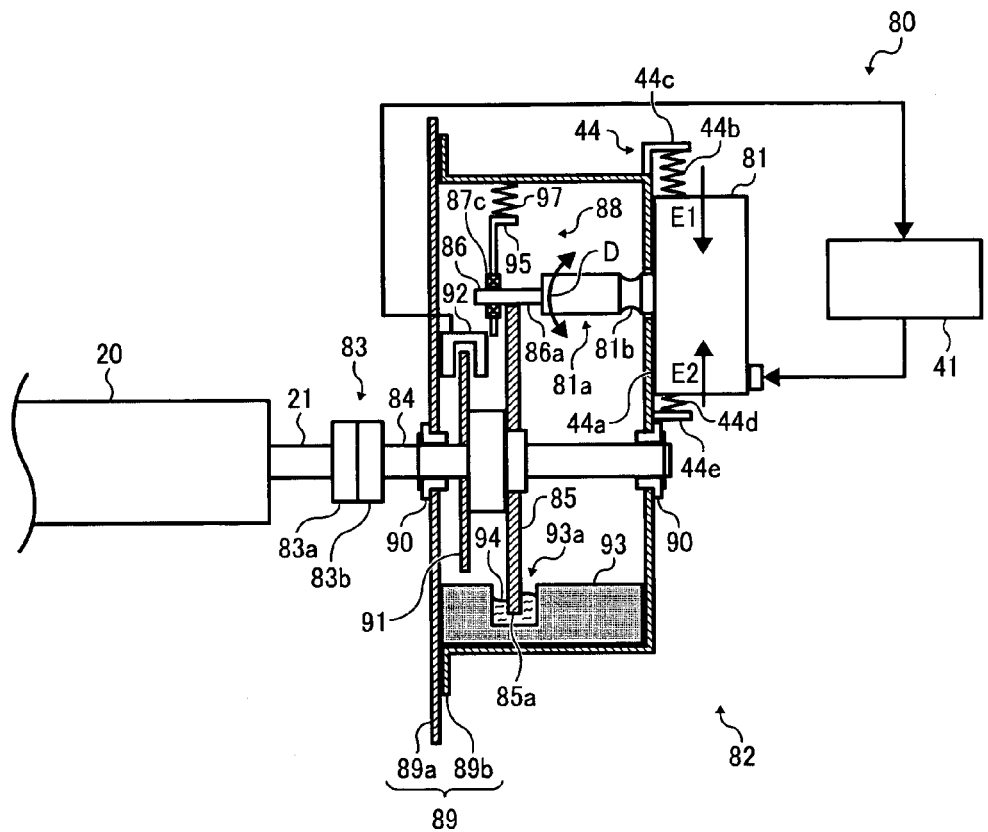
FIG. 18A is a cross-sectional view of a variation of the decelerator shown in FIG. 15A.
Figure 18B:
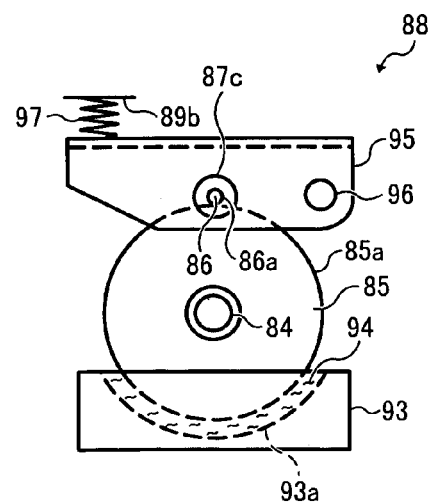
FIG. 18B is a front view of the pressure regulator of the decelerator of FIG. 18A.

FIG. 18A is a cross-sectional view of a variation of the decelerator 82 shown in FIG. 17A. FIG. 18B is a front view of the pressure regulator 88 of the decelerator 82 of FIG. 18A. The movable member 44 of the decelerator 82 illustrated in FIG. 18A does not include the rubber 44a. However, the movable member 44 includes a spring 44d and a bracket 44e supporting the spring 44d, in addition to the spring 44b and the bracket 44c. The spring 44d serves as a second urging member that urges the motor 81 upward in a second direction indicated by arrow E2 opposite the first direction indicated by arrow E1.

According to the present embodiment, the motor 81 is supported by the spring 44b and the spring 44d in the first direction E1 and the second direction E2, respectively. The spring 44d is provided to support the motor 81 from the bottom thereof.

The urging force of the spring 44b urging the motor 81 in the first direction E1 is substantially greater than the urging force of the spring 44d urging the motor 81 in the second direction E2. The resultant force coincides with the urging force of the spring 44b of the movable member 44 illustrated in FIG. 17 urging the motor 81 in the first direction E1.

With this configuration, the drive shaft 86 is pressed against the peripheral surface 85a while improving parallelism in the shaft direction of the drive shaft 86 relative to the shaft direction of the wheel 85. In this case, the spring 44b serves as the urging member provided to the pressure regulator 88 to press the drive shaft 86 against the wheel 85.

Figure 19A:
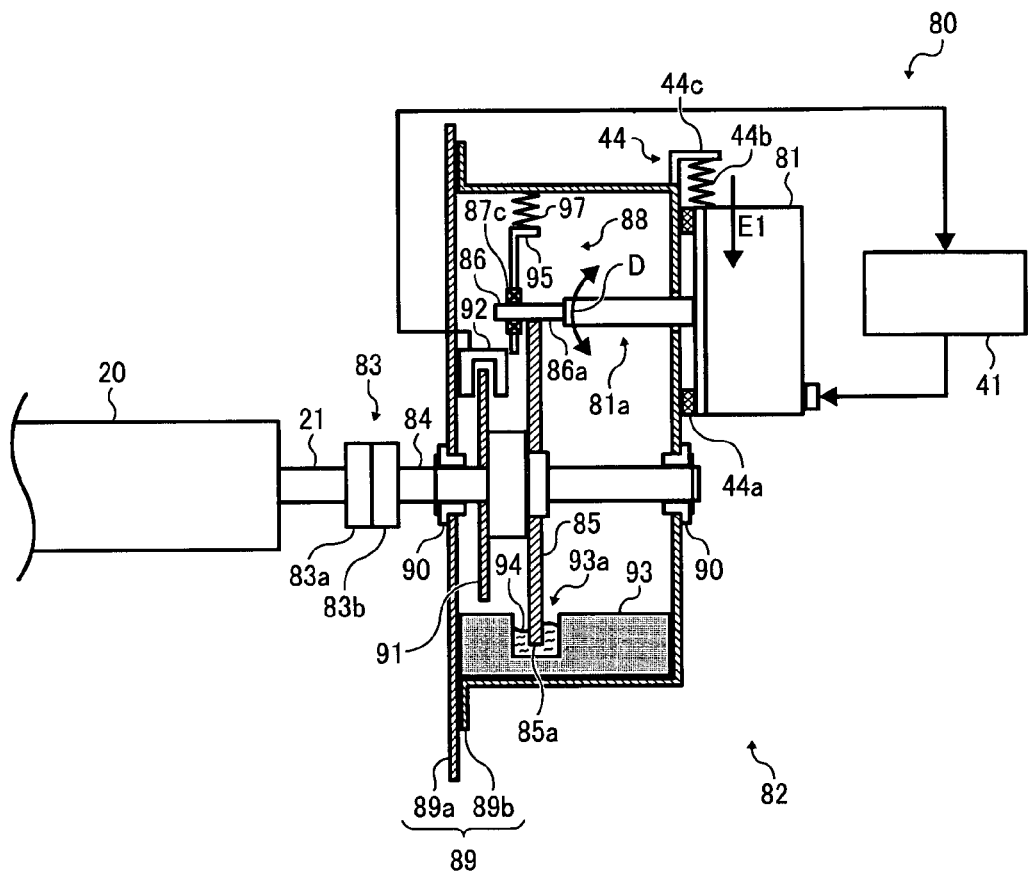
FIG. 19A is a cross-sectional view of a variation of the decelerator shown in FIG. 17A.
Figure 19B:
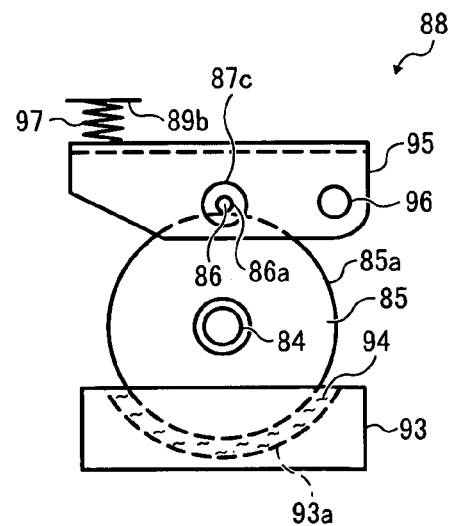
FIG. 19B is a front view of the pressure regulator of the decelerator of FIG. 19A.
Figure 20A:
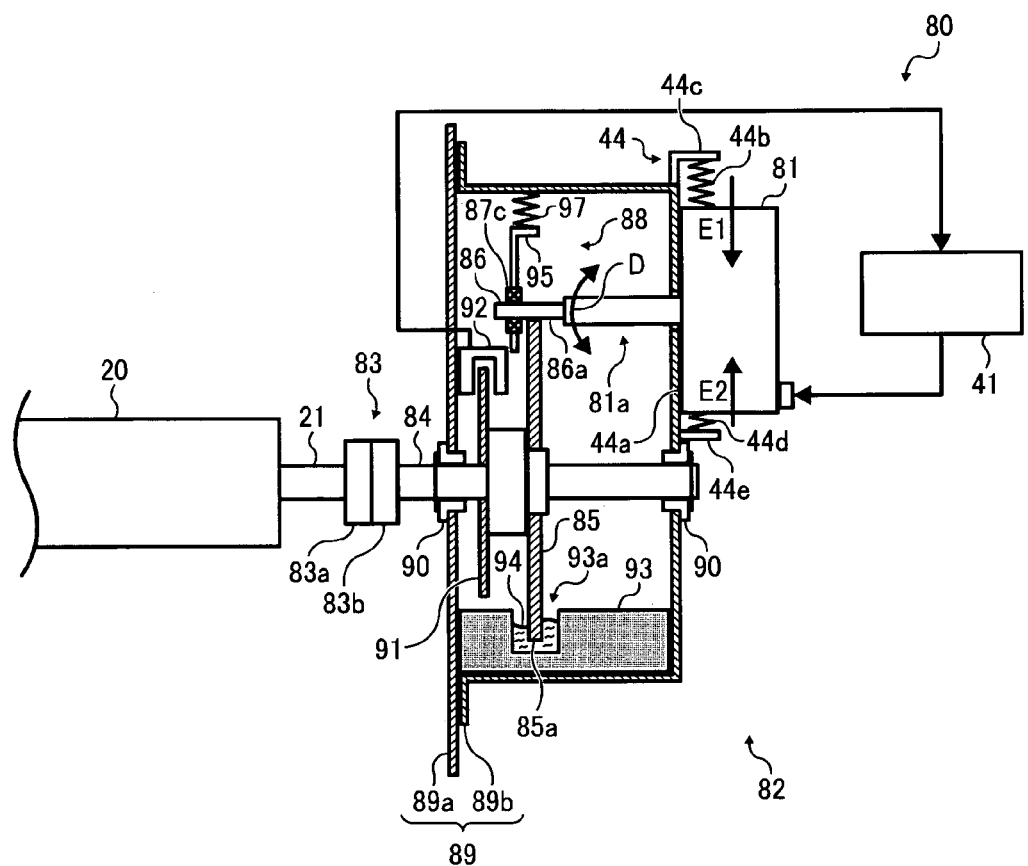
FIG. 20A is a cross-sectional view of a variation of the decelerator shown in FIG. 18A.
Figure 20B:
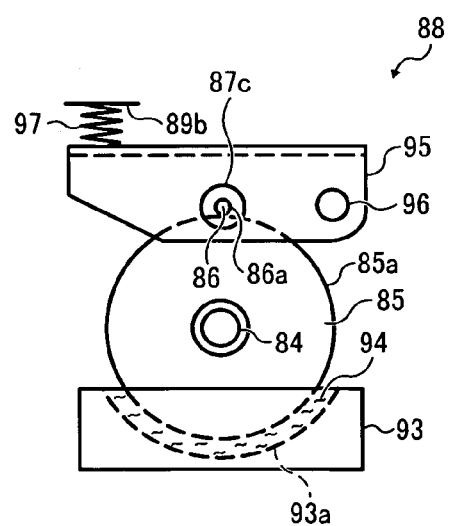
FIG. 20B is a front view of the pressure regulator of the decelerator of FIG. 20A.

With reference to FIGS. 19A through 20B, a description is provided of variations of the decelerator 82. FIG. 19A is a cross-sectional view of a variation of the decelerator 82 shown in FIG. 17A. FIG. 19B is a front view of the pressure regulator 88 of the decelerator 82 of FIG. 19A. FIG. 20A is a cross-sectional view of a variation of the decelerator 82 shown in FIG. 18A. FIG. 20B is a front view of the pressure regulator 88 of the decelerator of FIG. 20A.

The motor shaft 81a of the decelerator 82 illustrated in FIGS. 19 and 20 does not include the groove portion 81b. Instead, the diameter of the entire motor shaft 81a in FIGS. 19 and 20 is substantially small so that the entire motor shaft 81a can be flexed.

Figure 21A:
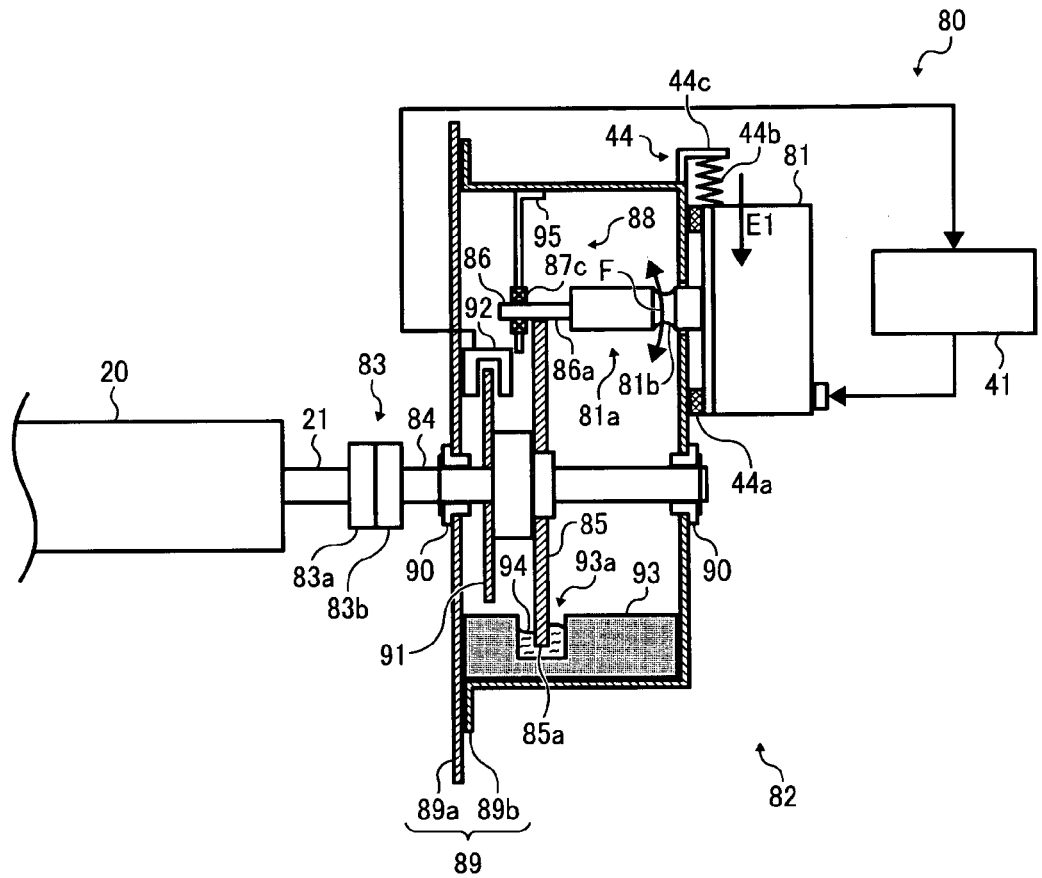
FIG. 21A is a cross-sectional view of a variation of the decelerator shown in FIG. 17A.
Figure 21B:
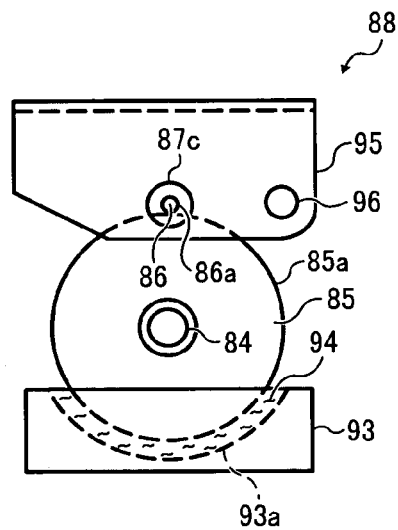
FIG. 21B is a front view of the pressure regulator of the decelerator of FIG. 21A.
Figure 22A:
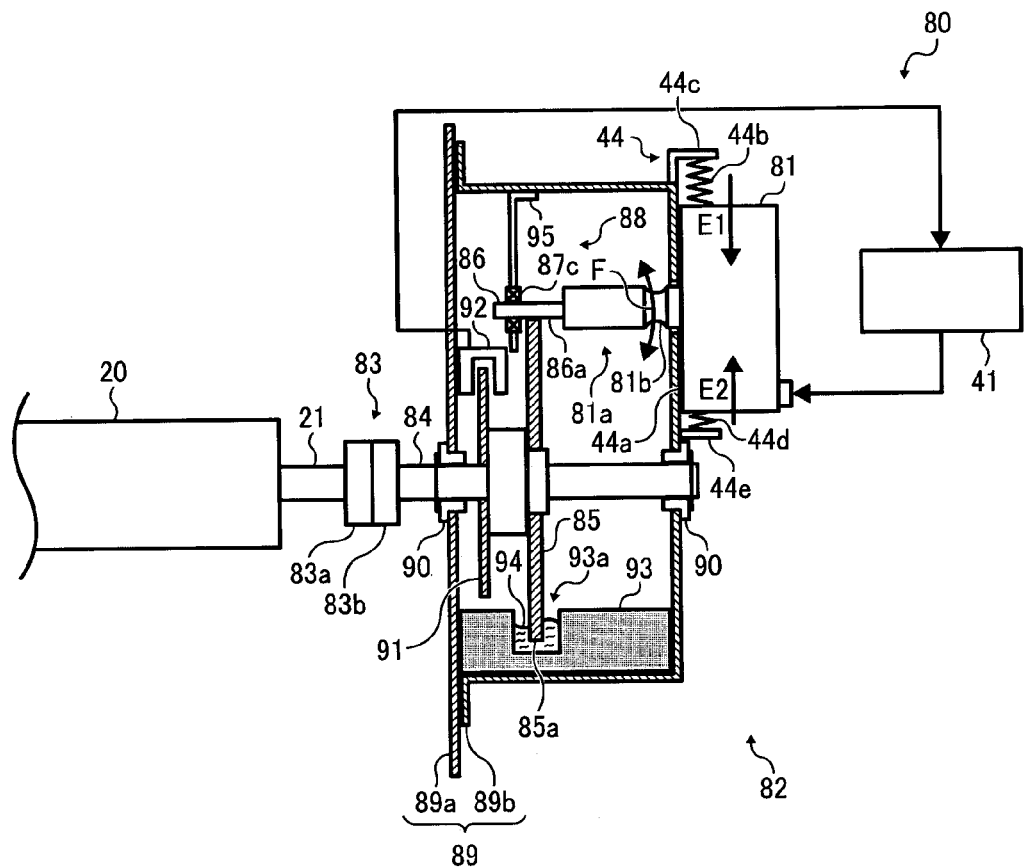
FIG. 22A is a cross-sectional view of a variation of the decelerator shown in FIG. 18A.
Figure 22B:
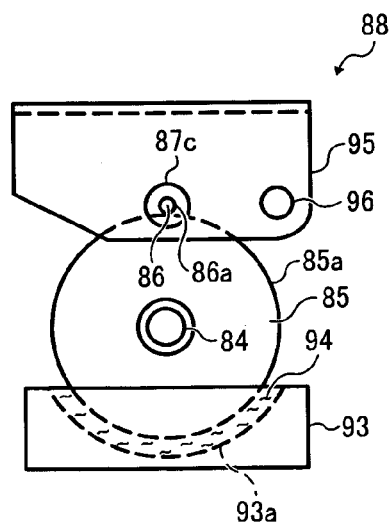
FIG. 22B is a front view of the pressure regulator of the decelerator of FIG. 22A.

With reference to FIGS. 21A through 22B, a description is provided of variations of the decelerator 82. FIG. 21A is a cross-sectional view of a variation of the decelerator 82 shown in FIG. 17A. FIG. 21B is a front view of the pressure regulator 88 of the decelerator 82 of FIG. 21A. FIG. 22A is a cross-sectional view of a variation of the decelerator 82 shown in FIG. 18A. FIG. 22B is a front view of the pressure regulator 88 of the decelerator 82 of FIG. 22A.

The pressure regulator 88 of the decelerator 82 illustrated in FIGS. 21A through 22B does not include the spring 97. According to the present embodiment, the pressure arm 95 is directly supported by the second side plate 89b. The stiffness, the size, and the mounting position of the pressure arm 95 are adjusted so as to serve as a pressure member that presses the drive shaft 86 against the wheel 85 at the same pressure as the pressure of the spring 97 pressing the drive shaft 86 against the wheel 85.

With this configuration, due to the pressure of the pressure arm 95, the motor 81 can slightly swingably move about the contact point of the drive shaft 86 and the wheel 85 in the direction of arrow F. In order to enhance parallelism, in FIG. 21, the amount of the urging force of the spring 44b is configured large enough to generate a moment of rotation equilibrated with a moment of rotation of the pressure of the pressure arm 95 about the contact point of the drive shaft and the wheel 85.

In FIG. 22, the amount of the resultant force of the urging force of the spring 44b and the spring 44d is configured large enough to generate the moment of rotation equilibrated with the moment of rotation of the pressure of the pressure arm 95 about the drive shaft 86 and the wheel 85. The spring 44b illustrated in FIGS. 21 and 22 serves as an urging member provided to the pressure regulator 88 so as to press the drive shaft 86 against the wheel 85.

Figure 23A:
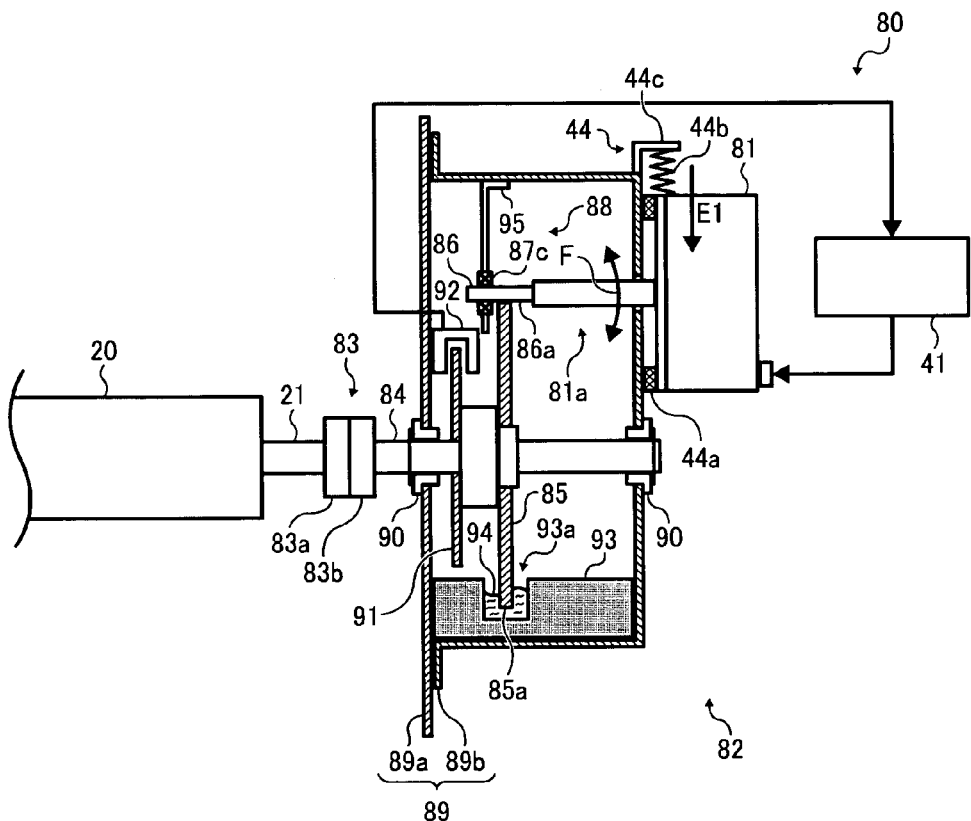
FIG. 23A is a cross-sectional view of a variation of the decelerator shown in FIG. 21A.
Figure 23B:
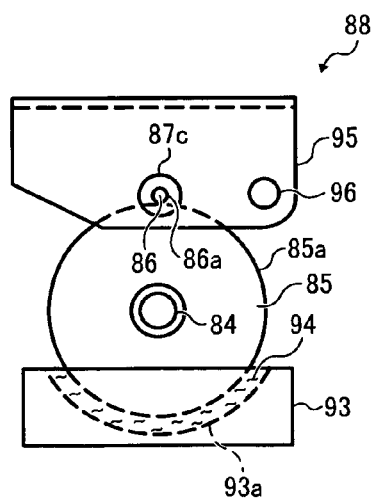
FIG. 23B is a front view of the pressure regulator of the decelerator of FIG. 23A.
Figure 24A:
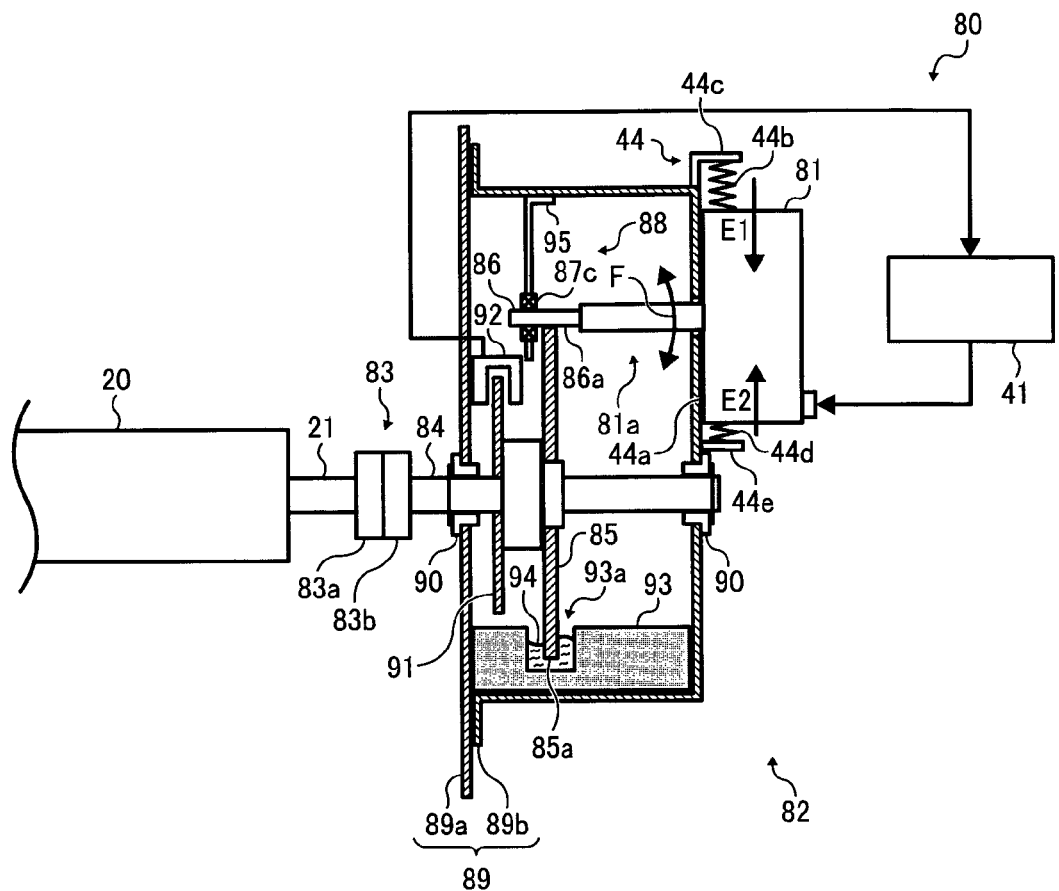
FIG. 24A is a cross-sectional view of a variation of the decelerator shown in FIG. 22A.
Figure 24B:
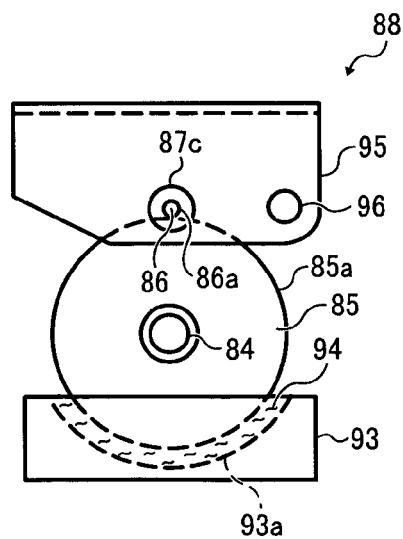
FIG. 24B is a front view of the pressure regulator of the decelerator of FIG. 24B.

With reference to FIGS. 23A through 24B, a description is provided of variations of the decelerator 82. FIG. 23A is a cross-sectional view of a variation of the decelerator 82 shown in FIG. 21A. FIG. 23B is a front view of the pressure regulator 88 of the decelerator 82 of FIG. 23A. FIG. 24A is a cross-sectional view of a variation of the decelerator 82 shown in FIG. 22A. FIG. 24B is a front view of the pressure regulator 88 of the decelerator 82 of FIG. 24B.

The motor shaft 81a of the decelerator 82 illustrated in FIGS. 23A and 24A does not include the groove portion 81b. According to the present embodiment, the diameter of the entire motor shaft 81a is substantially small so that the entire motor shaft 81a can be flexed.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

For example, the pressure regulator is not limited to either the driven member or the shaft bearing. The pressure regulator may include both the driven member and the shaft bearing. When the movable member includes the second urging member, the movable member may also include the elastic member.

According to the illustrative embodiment, the present invention can be employed in the image forming apparatus. The image forming apparatus includes, but is not limited to, an image forming apparatus using an intermediate transfer method in which toner images of different colors are sequentially overlappingly transferred onto an intermediate transfer member, forming a composite toner image, and the composite toner image is transferred onto the recording sheet. The present invention can be also applied to an image forming apparatus using a single photoreceptor drum. In the single-drum image forming apparatus, the toner images of different colors are sequentially overlappingly transferred onto the single photoreceptor drum. Furthermore, the present invention can be also applied to a monochrome image forming apparatus.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A decelerator for reducing a speed of rotation of a drive source and transmitting drive of the drive source to an image bearing member of an image forming apparatus, comprising:
    a drive shaft to be rotated by the drive source;
    a drive transmission member rotated by the drive shaft, the drive transmission member including a peripheral surface that contacts the drive shaft; and
    a pressure regulator to press the drive shaft against the drive transmission member toward a center of rotation of the drive transmission member,
    the pressure regulator including an alignment regulator to regulate alignment of the drive shaft in a direction of rotation of the drive transmission member,
    wherein the alignment regulator is provided facing the peripheral surface of the drive transmission member, regulates alignment of the drive shaft, and contacts at least two locations of a periphery of the drive shaft opposite the surface facing peripheral surface of the drive transmission member, and
    wherein the alignment regulator includes two rollers that contact the drive shaft so as to follow rotation of the drive shaft.

2. The decelerator according to claim 1, wherein contact locations where the alignment member and the drive shaft contact are locations where a resultant force of the pressure regulator pressing the drive shaft against the peripheral surface of the drive transmission member moves the drive shaft toward the center of rotation of the drive transmission member.

3. The decelerator according to claim 1, wherein the contact locations are symmetrical relative to a straight line connecting the center of rotation of the drive shaft and the center of rotation of the drive transmission member.

4. The decelerator according to claim 1, wherein the two rollers are ball bearings.

5. The decelerator according to claim 1, wherein the two rollers are needle roller bearings.

6. The decelerator according to claim 1, wherein the drive shaft includes a flexible portion of reduced diameter at a base thereof.

7. The decelerator according to claim 1, wherein the movable member includes an elastic member that movably supports the drive source relative to the stationary support member.

8. The decelerator according to claim 1, wherein the movable member includes an urging member that urges the drive source in a first direction in which the pressure regulator presses the drive shaft against the drive transmission member.

9. The decelerator according to claim 1, wherein the movable member includes a first urging member that urges the drive source in a first direction and a second urging member that urges the drive source in a second direction opposite the first direction, and an urging force of the first urging member urging the drive source in the first direction is greater than the urging force of the second urging member urging the drive source in the second direction.

10. The decelerator according to claim 1, further comprising:
    a lubricator to lubricate the drive shaft and the peripheral surface of the drive transmission member using a lubricant,
    wherein the drive shaft and the drive transmission member are made of metal.

11. The decelerator according to claim 10, wherein the lubricant is a traction oil.

12. The decelerator according to claim 1, further comprising:
    a detector to detect a rotation speed of the drive transmission member; and
    a rotation speed controller to control a rotation speed of the drive shaft so as to maintain a constant rotation speed of the drive transmission member.

13. A drive device for rotating an image bearing member, comprising:
    a drive source including a drive shaft; and
    a decelerator to reduce a speed of rotation of the drive source and transmit drive of the drive source to the image bearing member, the decelerator including:
        a drive transmission member rotated by the drive shaft, the drive transmission member including a peripheral surface that contacts the drive shaft; and
        a pressure regulator to press the drive shaft against the drive transmission member toward a center of rotation of the drive transmission member,
        the pressure member including an alignment regulator to regulate alignment of the drive shaft in a direction of rotation of the drive transmission member,
        wherein the image bearing member is rotated by the drive force of the drive source through the drive transmission member,
        wherein the alignment regulator is provided facing the peripheral surface of the drive transmission member, regulates alignment of the drive shaft, and contacts at least two locations of a periphery of the drive shaft opposite the surface facing peripheral surface of the drive transmission member, and
        wherein the alignment regulator includes two rollers that contact the drive shaft so as to follow rotation of the drive shaft.

14. An image forming apparatus for forming an image, comprising:
    an image bearing member to bear an electrostatic latent image on a surface thereof, driven by a drive device;
    a developing device to develop the electrostatic latent image formed on the image bearing member using toner to form a toner image;
    a transfer device to transfer the toner image onto a recording medium;
    a fixing device to fix the toner image; and
    the drive device including:
        a drive source including a drive shaft; and
        a decelerator to reduce a speed of rotation of the drive source and transmit drive of the drive source to the image bearing member, the decelerator including:

a drive transmission member rotated by the drive shaft, the drive transmission member including a peripheral surface that contacts the drive shaft; and a pressure regulator to press the drive shaft against the drive transmission member toward a center of rotation of the drive transmission member, the pressure regulator including an alignment regulator to regulate alignment of the drive shaft in a direction of rotation of the drive transmission member, wherein the image bearing member is rotated by the drive force of the drive source through the drive transmission member, wherein the alignment regulator is provided facing the peripheral surface of the drive transmission member, regulates alignment of the drive shaft, and contacts at least two locations of a periphery of the drive shaft opposite the surface facing peripheral surface of the drive transmission member, and wherein the alignment regulator includes two rollers that contact the drive shaft so as to follow rotation of the drive shaft.

* * * * *